US007725812B1

(12) United States Patent
Balkus et al.

(10) Patent No.: US 7,725,812 B1
(45) Date of Patent: May 25, 2010

(54) AUTHORING SYSTEM FOR COMBINING TEMPORAL AND NONTEMPORAL DIGITAL MEDIA

(75) Inventors: Peter A. Balkus, Acton, MA (US);
Glenn McElhoe, Arlington, MA (US);
T. Winton Crofton, Newton, MA (US);
Thomas C. Purcell, Northwood, NH (US)

(73) Assignee: Avid Technology, Inc., Tewksbury, MA (US)

( * ) Notice: Subject to any disclaimer, the term of this patent is extended or adjusted under 35 U.S.C. 154(b) by 0 days.

(21) Appl. No.: 09/539,749

(22) Filed: Mar. 31, 2000

(51) Int. Cl.
*G06F 17/21* (2006.01)

(52) U.S. Cl. .................. 715/202; 715/201; 715/203; 715/243; 715/246

(58) Field of Classification Search .............. 715/500.1, 715/501.1, 513, 517, 526, 200, 201, 202, 715/203, 204, 243, 255, 273, 234, 246; 345/716, 345/719, 720, 723, 724, 726, 704
See application file for complete search history.

(56) References Cited

U.S. PATENT DOCUMENTS 4,538,188 A    8/1985    Barker et al.

(Continued)

FOREIGN PATENT DOCUMENTS

EP            0403118        12/1990

(Continued)

OTHER PUBLICATIONS

Bulterman, D.C.A. et al, "GRiNS: A GRaphical INterface for creating and playing SMIL Documents", Computer Networks & ISDN Systems, Sep. 30, 1998, North Holland Publishing, Amsterdam, NL, vol. 30, NR. 1-7, pp. 519-529.

(Continued)

*Primary Examiner*—Stephen S Hong
*Assistant Examiner*—Gregory J Vaughn
(74) *Attorney, Agent, or Firm*—Oliver Strimpel

(57) ABSTRACT

An authoring tool has a graphical user interface enabling interactive authoring of a multimedia presentation including temporal and nontemporal media. The graphical user interface enables specification of the temporal and spatial relationships among the media and playback of the presentation with the specified temporal and spatial relationships. The spatial and temporal relationships among the media may be changed independently of each other. The presentation may be viewed interactively under the control of the author during the authoring process without encoding the audio and video data into a streaming media data file for combination with the other media, simulating behavior of a browser that would receive a streaming media data file. The multimedia presentation may include elements that initiate playback of the presentation from a specified point in time. After authoring of the presentation is completed, the authoring tool assists in encoding and transferring the presentation for distribution. Information about the distribution format and location may be stored as user-defined profiles. Communication with the distribution location may be tested and presentation and the distribution information may be audited prior to encoding and transfer to reduce errors. A presentation is encoded according to the defined temporal and spatial relationships and the distribution format and location information to produce and encoded presentation. The encoded presentation and any supporting media data are transferred to the distribution location, such as a server. A streaming media server may be used for streaming media, whereas other data may be stored on a conventional data server. Accounts may be provided for a streaming media server for authors to publish their presentations. The authoring tool may be associated with a service that uses the streaming media server. Such streaming media servers also may be a source of stock footage for use by authors.

18 Claims, 18 Drawing Sheets

U.S. PATENT DOCUMENTS

| | | | |
|---|---|---|---|
| 4,685,003 A | 8/1987 | Westland | |
| 4,746,994 A | 5/1988 | Ettlinger | |
| 5,012,334 A | 4/1991 | Etra | |
| 5,045,940 A | 9/1991 | Peters et al. | |
| 5,097,351 A | 3/1992 | Kramer | |
| 5,196,933 A | 3/1993 | Henot | |
| 5,214,528 A | 5/1993 | Akanabe et al. | |
| 5,237,648 A | 8/1993 | Mills et al. | |
| 5,267,351 A | 11/1993 | Reber et al. | |
| 5,274,758 A | 12/1993 | Beitel et al. | |
| 5,307,456 A | 4/1994 | MacKay | |
| 5,317,732 A | 5/1994 | Gerlach, Jr. et al. | |
| 5,390,138 A | 2/1995 | Milne et al. | |
| 5,404,316 A | 4/1995 | Klinger et al. | |
| 5,428,731 A | 6/1995 | Powers, III | |
| 5,442,744 A | 8/1995 | Piech et al. | |
| 5,467,288 A | 11/1995 | Fasciano et al. | |
| 5,481,664 A * | 1/1996 | Hiroya et al. | 715/500.1 |
| 5,488,433 A | 1/1996 | Washino et al. | |
| 5,489,947 A | 2/1996 | Cooper | |
| 5,493,568 A | 2/1996 | Sampat et al. | |
| 5,513,306 A | 4/1996 | Mills et al. | |
| 5,515,490 A | 5/1996 | Buchanan et al. | |
| 5,534,942 A | 7/1996 | Beyers, Jr. et al. | |
| 5,537,141 A | 7/1996 | Harper et al. | |
| 5,537,157 A | 7/1996 | Washino et al. | |
| 5,539,869 A | 7/1996 | Spoto et al. | |
| 5,541,662 A | 7/1996 | Adams et al. | |
| 5,561,457 A | 10/1996 | Cragun et al. | |
| 5,568,275 A | 10/1996 | Norton et al. | |
| 5,577,190 A | 11/1996 | Peters | |
| 5,584,006 A | 12/1996 | Reber et al. | |
| 5,585,858 A | 12/1996 | Harper et al. | |
| 5,592,602 A | 1/1997 | Edmunds et al. | |
| 5,613,057 A | 3/1997 | Caravel | |
| 5,617,146 A | 4/1997 | Duffield et al. | |
| 5,619,636 A | 4/1997 | Sweat et al. | |
| 5,623,308 A | 4/1997 | Civanlar et al. | |
| 5,652,714 A | 7/1997 | Peterson et al. | |
| 5,659,790 A * | 8/1997 | Kim et al. | 715/500.1 |
| 5,659,792 A | 8/1997 | Walmsley | |
| 5,659,793 A * | 8/1997 | Escobar et al. | 715/500.1 |
| 5,664,216 A | 9/1997 | Blumenau | |
| 5,669,006 A * | 9/1997 | Joskowicz et al. | 715/517 |
| 5,680,619 A | 10/1997 | Gudmundson et al. | |
| 5,682,326 A | 10/1997 | Klingler et al. | |
| 5,684,963 A | 11/1997 | Clement | |
| 5,712,953 A | 1/1998 | Langs | |
| 5,717,438 A * | 2/1998 | Kim et al. | 715/500.1 |
| 5,724,605 A | 3/1998 | Wissner | |
| 5,742,283 A * | 4/1998 | Kim | 715/500.1 |
| 5,752,029 A | 5/1998 | Wissner | |
| 5,754,851 A | 5/1998 | Wissner | |
| 5,760,767 A | 6/1998 | Shore et al. | |
| 5,764,275 A | 6/1998 | Lappington et al. | |
| 5,767,846 A * | 6/1998 | Nakamura et al. | 715/500.1 |
| 5,781,435 A | 7/1998 | Holroyd et al. | |
| 5,801,685 A | 9/1998 | Miller et al. | |
| 5,822,019 A | 10/1998 | Takeuchi | |
| 5,826,102 A | 10/1998 | Escobar et al. | |
| 5,852,435 A | 12/1998 | Vigneaux et al. | |
| 5,860,073 A * | 1/1999 | Ferrel et al. | 715/522 |
| 5,861,881 A | 1/1999 | Freeman et al. | |
| 5,878,421 A | 3/1999 | Meyer et al. | |
| 5,889,514 A * | 3/1999 | Boezeman et al. | 715/500.1 |
| 5,892,506 A * | 4/1999 | Hermanson | 715/500.1 |
| 5,892,507 A * | 4/1999 | Moorby et al. | 715/500.1 |
| 5,905,841 A | 5/1999 | Peters et al. | |
| 5,907,366 A | 5/1999 | Farmer et al. | |
| 5,910,825 A | 6/1999 | Takeuchi | |
| 5,926,613 A | 7/1999 | Schaffer | |
| 5,946,445 A | 8/1999 | Peters et al. | |
| 5,969,716 A * | 10/1999 | Davis et al. | 345/726 |
| 5,977,962 A | 11/1999 | Chapman et al. | |
| 5,978,648 A | 11/1999 | George et al. | |
| 5,982,445 A | 11/1999 | Eyer et al. | |
| 5,995,951 A | 11/1999 | Ferguson | |
| 5,999,173 A | 12/1999 | Ubillos | |
| 6,016,362 A | 1/2000 | Kato et al. | |
| 6,037,932 A | 3/2000 | Feinleib | |
| 6,038,573 A | 3/2000 | Parks | |
| 6,058,236 A | 5/2000 | Peters et al. | |
| 6,061,696 A * | 5/2000 | Lee et al. | 715/513 |
| 6,081,262 A * | 6/2000 | Gill et al. | 715/500.1 |
| 6,091,407 A | 7/2000 | Boetje et al. | |
| 6,092,122 A | 7/2000 | Liu et al. | |
| 6,118,444 A | 9/2000 | Garmon et al. | |
| 6,195,497 B1 | 2/2001 | Nagasaka et al. | |
| 6,199,082 B1 * | 3/2001 | Ferrel et al. | 715/522 |
| 6,201,924 B1 | 3/2001 | Crane et al. | |
| 6,212,527 B1 | 4/2001 | Gustman | |
| 6,230,173 B1 * | 5/2001 | Ferrel et al. | 715/513 |
| 6,237,025 B1 * | 5/2001 | Ludwig et al. | 709/204 |
| 6,243,087 B1 * | 6/2001 | Davis et al. | 345/723 |
| 6,249,280 B1 | 6/2001 | Garmon et al. | |
| 6,262,723 B1 * | 7/2001 | Matsuzawa et al. | 345/723 |
| 6,262,724 B1 | 7/2001 | Crowe et al. | |
| 6,292,827 B1 * | 9/2001 | Raz | 709/217 |
| 6,330,004 B1 * | 12/2001 | Matsuzawa et al. | 345/723 |
| 6,353,461 B1 | 3/2002 | Shore et al. | |
| 6,400,378 B1 | 6/2002 | Snook | |
| 6,404,978 B1 | 6/2002 | Abe | |
| 6,411,725 B1 | 6/2002 | Rhoads | |
| 6,426,778 B1 | 7/2002 | Valdez, Jr. | |
| 6,430,355 B1 | 8/2002 | Nagasawa | |
| 6,476,828 B1 * | 11/2002 | Burkett et al. | 345/760 |
| 6,484,199 B2 | 11/2002 | Eyal | |
| 6,489,969 B1 | 12/2002 | Garmon et al. | |
| 6,515,656 B1 * | 2/2003 | Wittenburg et al. | 705/27 |
| 6,544,294 B1 * | 4/2003 | Greenfield et al. | 715/526 |
| 6,546,405 B2 | 4/2003 | Gupta et al. | |
| 6,553,142 B2 | 4/2003 | Peters | |
| 6,564,263 B1 * | 5/2003 | Bergman et al. | 709/231 |
| 6,618,547 B1 | 9/2003 | Peters et al. | |
| 6,665,732 B1 * | 12/2003 | Garofalakis et al. | 709/247 |
| 2002/0188628 A1 | 12/2002 | Cooper et al. | |
| 2003/0018609 A1 | 1/2003 | Phillips et al. | |
| 2004/0268224 A1 | 12/2004 | Balkus et al. | |
| 2005/0120127 A1 | 6/2005 | Bradley et al. | |

FOREIGN PATENT DOCUMENTS

| | | |
|---|---|---|
| EP | 0469850 | 2/1992 |
| EP | 0526064 | 2/1993 |
| EP | 0564247 | 10/1993 |
| EP | 0592250 | 4/1994 |
| EP | 0596823 | 5/1994 |
| EP | 0613145 | 8/1994 |
| EP | 0689133 | 10/1995 |
| EP | 0706124 | 4/1996 |
| GB | 2336025 | 10/1999 |
| WO | WO88/07719 | 10/1988 |
| WO | WO93/21636 | 10/1993 |
| WO | WO94/03897 | 2/1994 |
| WO | WO94/29868 | 12/1994 |
| WO | WO96/26600 | 8/1996 |
| WO | WO96/31829 | 10/1996 |
| WO | WO96/36007 | 11/1996 |
| WO | WO97/12342 | 4/1997 |
| WO | WO97/37497 | 10/1997 |
| WO | WO 97/41504 | 11/1997 |
| WO | WO98/04984 | 2/1998 |
| WO | WO99/52045 | 10/1999 |
| WO | WO 9952045 | 10/1999 |

WO WO00/73875 12/2000

OTHER PUBLICATIONS

Fahmi, H. et al., "Distributed framework for real-time multimedia object communication", Object-Oriented Real-Time Distributed Computing 2000, ISORC 2000, Proceedings, Third IEEE International Symposium, Newport, CA, USA, Mar. 15-17, 2000, Los Alamitos, CA, USA, IEEE Computer Society, pp. 252-259.
Sauer, S. et al., "Extending UML for modeling of multimedia applications", Visual Languages, 1999, Proceedings 1999 IEEE Symposium, Tokyo, JP, Sep. 13-16, 1999, Los Alamitos, CA, USA, IEEE Computer Society, pp. 80-87.
AAF Specification Version 1.0 DR4, 2000, pp. i-181.
Ackermann, Phillipp, "Design and Implementation of an Object-oriented Media Composition Framework", Int'l. Computer Music Conference, 1994.
Agnew, J.N. et al., "The Right Tool for the Job: A Quest for the Perfect Authoring Package", Proceedings of SIGDOC '92: 10th Annual ACM Conference on Systems Documentation, Oct. 1992, Ottawa, Ontario, Canada, pp. 253-258.
"Authorware Users Guide", Macromedia Inc., 1992, pp. 8-9, 12-13, 15, 17, 20, 25, 28-31, 36-37, 43, 46-47, 115, 178-179, 191, 232, 242, 301-302.
Baecker, R. et al., "A Multimedia System for Authoring Motion Pictures", ACM Multimedia 1996, pp. 31-42.
Blakowski, Gerold, et al., "Tools for Specifying and Executing Synchronized Multimedia Presentations", Proc. 2nd Int'l. Workshop on OS for Digital Audio Video, Nov. 18-19, 1991, pp. 271-279.
The Brughetti Corporation, Product Information for PURE Image Creator, SLICE Transition Maker and AIR Playout Manager, 1994, (11 pages).
Buchanan, M. Cecelia, et al., "Automatic Temporal Layout Mechanisms", Proc. ACM Multimedia 1993, pp. 341-350.
Buchanan, M. Cecelia, et al., "Specifying Temporal Behavior in Hypermedia Documents", ECHT '92, pp. 262-271.
Buford, John F., "Integrating Object-Oriented Scripting Languages with HyTime", from Proceedings of ICMCS 1994 IEEE, pp. 1-10.
Bulterman, Dick C.A., et al., "Multimedia Authoring Tools: State of the Art and Research Challenges", LNCS 1000, 1995, pp. 1-17.
Chiu, Patrick et al., A Dynamic Grouping Technique for Ink and Audio Notes, USIT -98, San Francisco, CA, 1998 ACM, pp. 195-202.
Chiueh, Tzi-cker, et al., Zodiac: A History-Based Interactive Video Authoring System:, ACM Multimedia '98, Bristol, UK, 1998 ACM, pp. 435-443.
Chua, Tat-Seng, et al., "A Video Retrieval and Sequencing System", ACM Transactions on Information Systems, vol. 13, No. 4, Oct. 1995, pp. 373-407.
"The Coming Revolution", Communications of the ACM, Jul. 1989, vol. 32, No. 7, pp. 794-901.
Csinger, Andrew, et al., "AI Meets Authoring: User Models for Intelligent Multimedia, Artificial Intelligence Review, special issue on user modelling", 8, pp. 447-468, 1995.
Drapeau, George D. et al., "MAEstro—A Distributed Multimedia Authoring Environment", USENIX, Summer 1991, pp. 315-328.
Drapeau, George D., "Synchronization in the MAEstro Multimedia Authoring Environment", ACM Multimedia 1993, pp. 331-340.
Davenport, Gloriana, et al., "Cinematic Primitives for Multimedia", 1991 IEEE, Jul. 1991, pp. 67-74.
The Electronic Scrapbook: Towards an Intelligent Home-Video Editing System, by Amy Susan Bruckman, Sep. 1991, Video Mosaic: Laying Out Time In a Physical Space.
Eun, Seong Bae, at al., "Specification of Multimedia Composition and A Visual Programming Environment", Proceeding of the first ACM International Conference on Multimedia, pp. 167-173, 1993.
Gephard, C., Der Widersenstigen Zahmung: Computer & Video Radio Fernsehen Electronik, vol. 44, No. 1, Jan. 1, 1995, Berlin, DE.
Gibbs, Simon, "Composite Multimedia and Active Objects", in Proc. OOPSLA 1991, pp. 1-16.
Gibbs, Simon, "Data Modeling of Time-Based Media", SIGMOD '94, 1994 ACM, pp. 91-102.
Gibbs, Simon, "Video Nodes and Video Webs: Uses of Video in Hypermedia", Proc. ACM Conf. on Hypertext, 1992, p. 3.

Girgensohn, Andreas, et al., "A Semi-automatic Approach to Home Video Editing", UIST '00, San Diego, CA, 2000 ACM, CHI Letters vol. 2, 2, pp. 81-89.
Gruenette R., "Authorware and IconAuthor", CD-ROM Professional, vol. 8, No. 10, Oct. 1995, pp. 81-98.
Hardman, H., "New Authoring Tools for Windows", BYTE, vol. 18, No. 9, Aug. 1993, pp. 153-156.
Hardman, Lynda, et al, "Authoring Interactive Multimedia: Problems and Prospects", CWI Quarterly, vol. 7(1) 1994, pp. 47-66.
Hardman, Lynda, et al., "Structured Multimedia Authoring", ACM Multimedia 1993, pp. 283-289.
Herman, I., et al., "MADE: A Multimedia Application Development Environment", CWI Quarterly, vol. 7(1) 1994, pp. 27-46.
Hirata, Kyoji, et al., "Content-Oriented Integration in Hypermedia Systems," Hypertext '86, 7th ACM Conf. On Hypertext, Conf. 7, Mar. 1996, pp. 11-21.
Hirzalla, Nael, et al, "A temporal Model for Interactive Multimedia Scenarios", in IEEE Multimedia, vol. 2, No. 3, Fall 1995, pp. 24-31.
Hudson, Scott E., et al., "The Walk-Through Approach To Authoring Multimedia Documents", Multimedia '94, 1994 ACM, pp. 173-180.
Hung, Yung-Chen, "A Hypervideo System Generator", Software Practice and Experience, vol. 17(11), Nov. 1997, pp. 1263-1281.
Koegel, J.F., et al., "Improving Visual Programming Languages for Multimedia Authoring", Educational Multimedia and Hypermedia Annula, 1993, Proceedings of Ed-Media 93-World on Educational Multimedia And Hypermedia, Jun. 1993, Orlando, FL, pp. 286-293.
Kurlander, David, et al., "A Visual Language for Browsing, Undoing, and Redoing Graphical Interface Commands", in Visual Languages and Visual Programming, 1990, pp. 257-275.
Mackay, W.E., et al., "Video Mosaic: Laying Out Time In A Physical Space", Proceedings of Multimedia '94, San Francisco, CA, ACM, 8 pages.
Mackay, W.E., et al., "Virtual Video Editing in Interactive Multimedia Applications", Communications Of the ACM, Jul. 1989, vol. 32, No. 7, pp. 802-810.
Macromind Mediamaker, MacrornindInc., 1990, pp. 129, 165 and 166.
Matthews, James, et al, "VideoScheme: A Programmable Video Editing System for Automation and Media Recognition", ACM Multimedia 1993.
Ohanian, Tom, "The Avid 1 Media Composer", International Broadcast Engineer, Jan. 1991, pp. 22-23.
Open Media Framework, OMF Interchange Specification, Avid Technology, Inc., Version 2.0, Nov. 29, 1995, pp. i-245.
Pazandak, Paul, et al., "A Multimedia Temporal Specification Model and Language", Technical Report 94-33, University of Minnesota, 1994.
Ryan, Mark, et al., "A Development Process for Large Multimedia Titles", 1994 ACM, pp. 126-138.
Sack, Warren et al., "IDIC: Assembling Video Sequences from Story Plans and Content Annotations", In: Proceedings of IEEE International Conf. on Multimedia Computing and Systems in Boston, MA, IEEE Computer Society Press, pp. 30-36, 1994.
Schleicher, Stephen, "How To Create Web Markers in Premiere 6", Digital Video Editing, Digital Media Online, 2001.
"Schneller Zugriff: Video Machine Von Fast", Radio Fernshen Elektronik, vol. 44, No. 11, Nov. 1, 1995, Berlin, DE.
Siochi, A., et al, "The Integrator: A Prototype for Flexible Development of Interactive Digital Multimedia Applications", Interactive Multimedia, vol. 2, No. 3, 1993, pp. 5-26.
Tonomura, Yoshinobu, "Video Handling Based on Structured Information for Hypermedia Systems", Proceedings of the Int'l Conference of Multimedia Information Systems, Jan. 1991, pp. 333-334.
Ueda, Horotada, et al., "Automatic Scene Separation and Tree Structure GUI for Video Editing", ACM Multimedia 96, Boston, MA, 1996 ACM, pp. 405-406.
Ueda, Hirotada et al., "Automatic Structure Visualization for Video Editing"; Interchi '93, 1993 ACM, Apr. 24-29, 1993, pp. 137-141; 545-546.
Ueda, Hirotada, et al., Impact: An Interactive Natural-Motion-Picture Dedicated Multimedia Authoring System, 1991 ACM, pp. 343-350.
Ueda, Hirotada, et al., "Impact: Interactive Motion Picture Authoring system for Creative Talent", 1993 ACM, p. 525.

Wahl, Thomas, et al., "Representing Time in Multimedia Systems", Proc. IEEE Int'l Conf. on Multimedia, 1994, pp. 538-543.

Van der Sluis, Ielka et al., "Enriching Textual Documents with Timecodes from Video Fragments", In: Proceedings RIAO 2000 Content-Based Multimedia Information Access, Paris, Apr. 2000, pp. 431-440.

Wahl, Thomas, et al., "Tiempo: Temporal Modeling and Authoring of Interactive Multimedia", Proc. Int'l Conf. of Multimedia, 1995, pp. 274-277.

Weiss, Ron., et al., "Content-Based Access to Algebraic Video", Proceeding Int'l Conf. on Multimedia Computing and Systems, pp. 140-151, Boston, MA, May 1994.

Candan, K. Selcuk, et al., "CHIMP: A Framework for Supporting Distributed Multimedia Document Authoring and Presentation", ACM Multimedia 96, Boston, MA, pp. 329-340.

Mines, Robert F. et al., "DAVE: A Plug and Play Model for Distributed Multimedia Application Development", ACM Multimedia 94, San Francisco, CA, pp. 59-66.

Nicol, John R., et al., "How the Internet Helps Build Collaborative Multimedia Applications", Communications of the ACM, Jan. 1999, vol. 42, No. 1, pp. 79-85.

Jourdan, Muriel, et al., "Authoring SMIL documents by direct manipulations during presentation", World Wide Web, Baltzer Science Publishers, BV, XP-000986864. vol. 2, No. 4, 1999, pp. 179-190.

RealNetworks Inc., "RealProducer Pro User's Guide Version G2", XP-002149005, internet citation Feb. 2, 1999, pp. i-62.

* cited by examiner

| TABLE OF CONTENTS | |
|---|---|
| A1 | |
| A2 | |
| V1 | |
| V2 | |
| TITLES | |
| EVENT1 | |
| EVENT2 | |

308 — TABLE OF CONTENTS
300 — A1, A2
302 — V1, V2
306 — TITLES
304 — EVENT1, EVENT2

FIG. 3

AUTHORING SYSTEM FOR COMBINING TEMPORAL AND NONTEMPORAL DIGITAL MEDIA

BACKGROUND

A variety of systems are used for authoring multimedia presentations such as motion pictures, television shows, advertisements for television, presentations on digital versatile disks (DVDs), interactive hypermedia, and other presentations. Such authoring systems generally provide a user interface and a process through which multimedia data is captured and stored, and through which the multimedia presentation is created, reviewed and published for distribution. The user interface and process for authoring generally depend on the kind of presentation being created and what the system developer believes is intuitive and enables an author to work creatively, flexibly and quickly.

Some multimedia presentations are primarily nontemporal presentations. That is, any change in the presentation typically depends on user activity or other event, instead of the passage of time. Some nontemporal multimedia presentations may include temporal components. For example, a user may cause a video to be displayed that is related to a text document by selecting a hyperlink to the video in the document.

Other multimedia presentations are primarily temporal presentations incorporating audio and/or video material, and optionally other media related to the temporal media. Primarily temporal media presentations that are well known today include streaming media formats such as QuickTime, Real Media, Windows Media Technology and SMIL, and formats that encode data in the vertical blanking interval of a television signal, such as used by WebTV, ATVEF, and other similar formats.

A variety of authoring tools have been developed for different kinds of presentations. Tools for processing combined temporal and nontemporal media include those described in PCT Publication No. WO99/52045, corresponding to U.S. patent application Ser. No. 09/054,861, and PCT Publication No. WO96/31829, corresponding to U.S. patent application Ser. No. 08/417,974, and U.S. Pat. No. 5,659,793 and U.S. Pat. No. 5,428,731.

SUMMARY

An authoring tool has a graphical user interface enabling interactive authoring of a multimedia presentation including temporal and nontemporal media. The graphical user interface enables specification of the temporal and spatial relationships among the media and playback of the presentation with the specified temporal and spatial relationships. The spatial and temporal relationships among the media may be changed independently of each other. The presentation may be viewed interactively under the control of the author during the authoring process without encoding the audio and video data into a streaming media data file for combination with the other media, simulating behavior of a browser that would receive a streaming media data file. The multimedia presentation may include elements that initiate playback of the presentation from a specified point in time. After authoring of the presentation is completed, the authoring tool assists in encoding and transferring the presentation for distribution. Information about the distribution format and location may be stored as user-defined profiles. Communication with the distribution location may be tested and presentation and the distribution information may be audited prior to encoding and transfer to reduce errors. A presentation is encoded according to the defined temporal and spatial relationships and the distribution format and location information to produce and encoded presentation. The encoded presentation and any supporting media data are transferred to the distribution location, such as a server. A streaming media server may be used for streaming media, whereas other data may be stored on a conventional data server. Accounts may be provided for a streaming media server for authors to publish their presentations. The authoring tool may be associated with a service that uses the streaming media server. Such streaming media servers also may be a source of stock footage for use by authors. These various functions, and combinations thereof, of the authoring tool are each aspects of the present invention that may be embodied as a computer system, a computer program product or a computer implemented process that provides these functions.

In one embodiment, the spatial relationship may be defined by a layout specification that indicates an association of one or more tracks of temporal media and one or more tracks of nontemporal media with a corresponding display location. If the temporal media is not visible, such as audio, the spatial relationship may be defined among the nontemporal media.

One kind of temporal relationship between nontemporal data and temporal media is provided by a table of contents track. The nontemporal media of elements associated with points in time in the table of contents track of a presentation is combined and displayed for the duration of the presentation. If a user selects one of the elements from the table of contents track, presentation of the temporal media data is initiated from the point in time associated with that element on the table of contents track.

It is also possible to associate a streaming media presentation with another streaming media presentation. For example, an event in one streaming media presentation may be used to initiate playback of another subsequent streaming media presentation. The two presentations may have different layout specifications. A document in a markup language may be created to include a hyperlink to each of the plurality of streaming media presentations.

BRIEF DESCRIPTION OF THE DRAWINGS

FIG. 3 is an illustration of a timeline for defining a multimedia presentation;

DETAILED DESCRIPTION

In this description, all patent applications and published patent documents referred to herein are hereby incorporated by reference.

Figure 1:
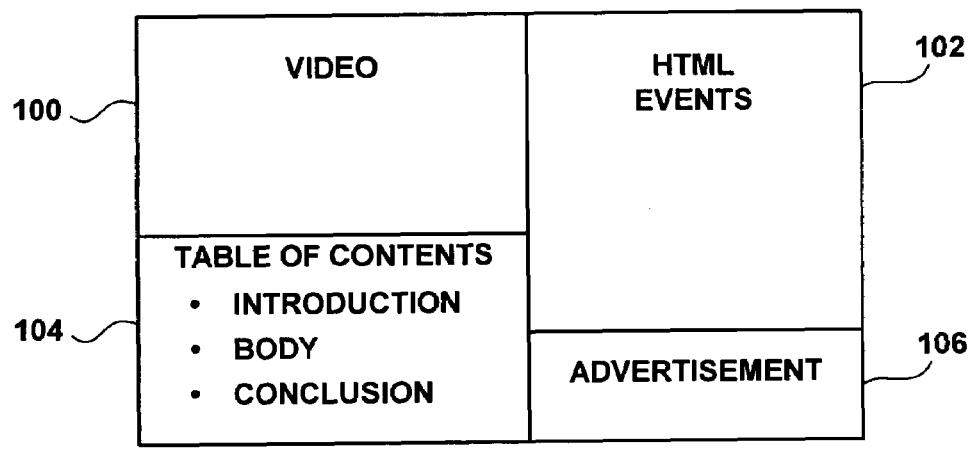
FIG. 1 is an illustration of an example multimedia presentation.

Referring to FIG. 1, an example of a multimedia presentation, which may be created using an authoring system to be described herein, will now be described. In general, a multimedia presentation is a combination of temporal media, such as video, audio and computer-generated animation, and nontemporal media, such as still images, text, hypertext documents, etc. Some temporal media, such as animations in the GIF format or the Macromedia Flash formats may be used as if they were nontemporal media. The temporal and nontemporal media may be combined in many different ways. For example, a a multimedia presentation may include audio and/or video combined with multimedia slides that are time synchronized with the audio and/or video. The presentation also may include advertisements and/or an index of the temporal media. In general, there is a temporal relationship and a spatial relationship among the temporal and nontemporal media. In some presentations, only a temporal relationship exists between certain temporal media, such as audio, and the nontemporal media. An example presentation shown in FIG. 1, includes video 100, HTML events 102, a table of contents 104, and an advertisement 106.

Figure 2:
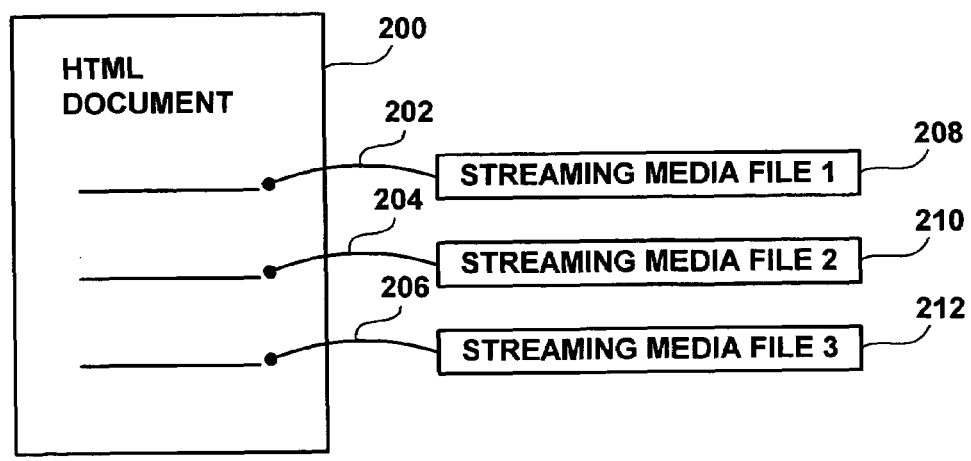
FIG. 2 is an illustration of a relationship among multiple presentations.

FIG. 2 illustrates a more complex multimedia presentation format. This multimedia presentation includes a hypermedia document 200, for example in a markup language, including hyperlinks to one or more streaming media presentations, as indicated at 202, 204, and 206. Upon selection of a hyperlink, the corresponding streaming multimedia presentation 208, 210 or 212 may be played. An event at or near the end of a streaming multimedia presentation may be used to initiate playback of the subsequent multimedia presentation. The different presentations may have different specified spatial relationships.

There are many ways in which such multimedia presentations may be stored. For example, various streaming media formats, such as Real Media, Microsoft Windows Media Technology, QuickTime and SMIL, may be used. The temporal media also may be encoded in a television signal, with nontemporal media encoded in a vertical-blanking interval of the television signal, such as used by WebTV, ATVEF and other formats.

Creating such a multimedia presentation involves creating a temporal relationship between each element of nontemporal media and the temporal media. Such a relationship may be visualized using a timeline, an example of which is shown in FIG. 3. In general, a timeline has one or more tracks of temporal media, and one or more tracks of nontemporal media. For example, there may be one video track, one audio track, and an event track. The presentation of the media on all the tracks is synchronized by the positions of the elements in the timeline. These positions may be specified graphically through a graphical user interface. Various data structures may be used to represent such a timeline, such as those described in U.S. Pat. No. 5,584,006 (Reber), U.S. Pat. No. 5,724,605 (Wissner) and PCT Publication No. WO98/05034.

The timeline is a time based representation of a composition. The horizontal dimension represents time, and the vertical dimension represents the tracks of the composition. Each track has a row in the timeline which it occupies. The size of a displayed element in a graphical user interface is determined as a function of the duration of the segment it represents and a timeline scale. Each element in each track of the timeline has a position (determined by its start time within the presentation), a title and associated data and optionally a duration.

FIG. 3 illustrates an example timeline which includes two audio tracks 300, two video tracks 302, two event tracks 304, a title track 306, and a table of contents track 308. Each of these tracks will now be described.

An audio track 300 or a video track 302 is for placement of temporal media. Such tracks commonly are used in video editing applications, such as shown in PCT Publication No. WO98/05034, which corresponds to U.S. patent application Ser. Nos. 08/687,926 and 08/691,985. Similarly, a title track 306 commonly is used to create title effects for movies, such as scrolling credits. As such, titles commonly are considered temporal media because they have parameters that are animated over time and that are combined with video data. Each track supports defining a sequence of segments of media data. A segment references, either directly or indirectly, the media data for the segment.

In the timeline shown herein, event tracks 304 associate nontemporal media with a particular point in time, thus creating a temporal relationship with the temporal media in tracks 300, 302, and 306. Each event track is a list of events. Each event includes a time and references a data file or a uniform resource locator, either directly or indirectly, from which media data for the event may be received.

The table of contents track 308 associates a table of contents entry with a point in time. The table of contents may be used as an index to the temporal media. Each entry includes a time and associated content, typically text, entered by the author. As described in more detail below, the table of contents entries are combined into a single document for display. If a user selects an element in the table of contents as displayed, the presentation is displayed starting at the point in time corresponding to the selected element.

The spatial relationship of the elements in the timeline as presented also may be specified by the author. In one simple example, a layout specification indicates a combination of frames of a display area, of which one or more frames is associated to one or more of the tracks in the timeline. Some tracks might not be associated with a display frame. Some frames might be associated directly with static media and not with a track. In general a frame is associated with only one track and a track is associated with only one frame.

Figure 4:
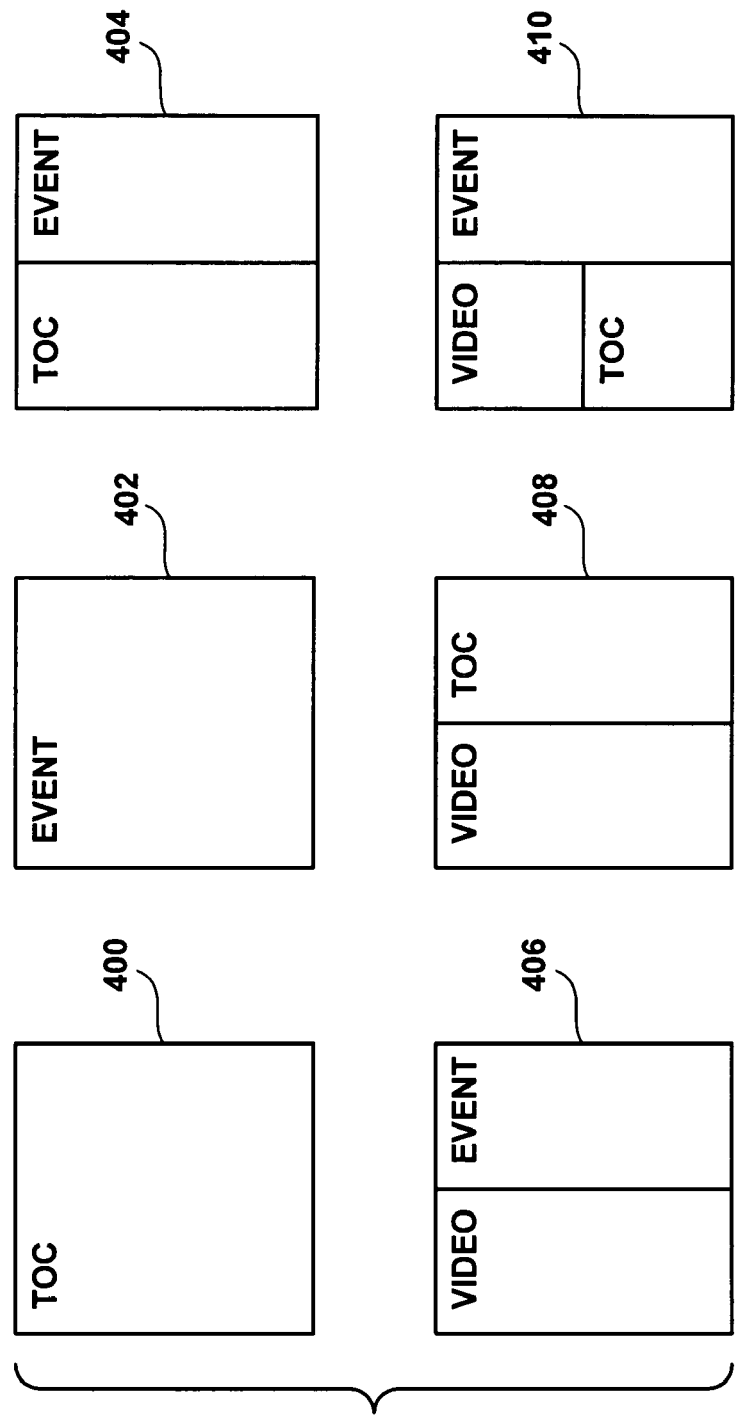
FIG. 4 illustrates example layouts for a multimedia presentation.

The possible combinations and arrangements of the various tracks in a timeline are unlimited, and are not limited to visual media. As shown in the examples in FIG. 4, the visual display may be merely a table of contents 400, or an event track 402, or both 404, for example, in combination with audio. These examples are merely illustrative. In some cases, the audio has a corresponding visual component that may be displayed, such as volume and position controls. Video may be displayed, for example, with an event track 406, or a table of contents track 408, or both 410, such as shown in FIG. 4.

A graphical user interface, and example of which is described in connection with FIG. 5, enables a user to select from among several layout specifications that have been stored as templates. A graphical user interface, an example of which is described in connection with FIG. 6, enables an author to make assignments between tracks in the timeline and frames in the display.

Figure 5:
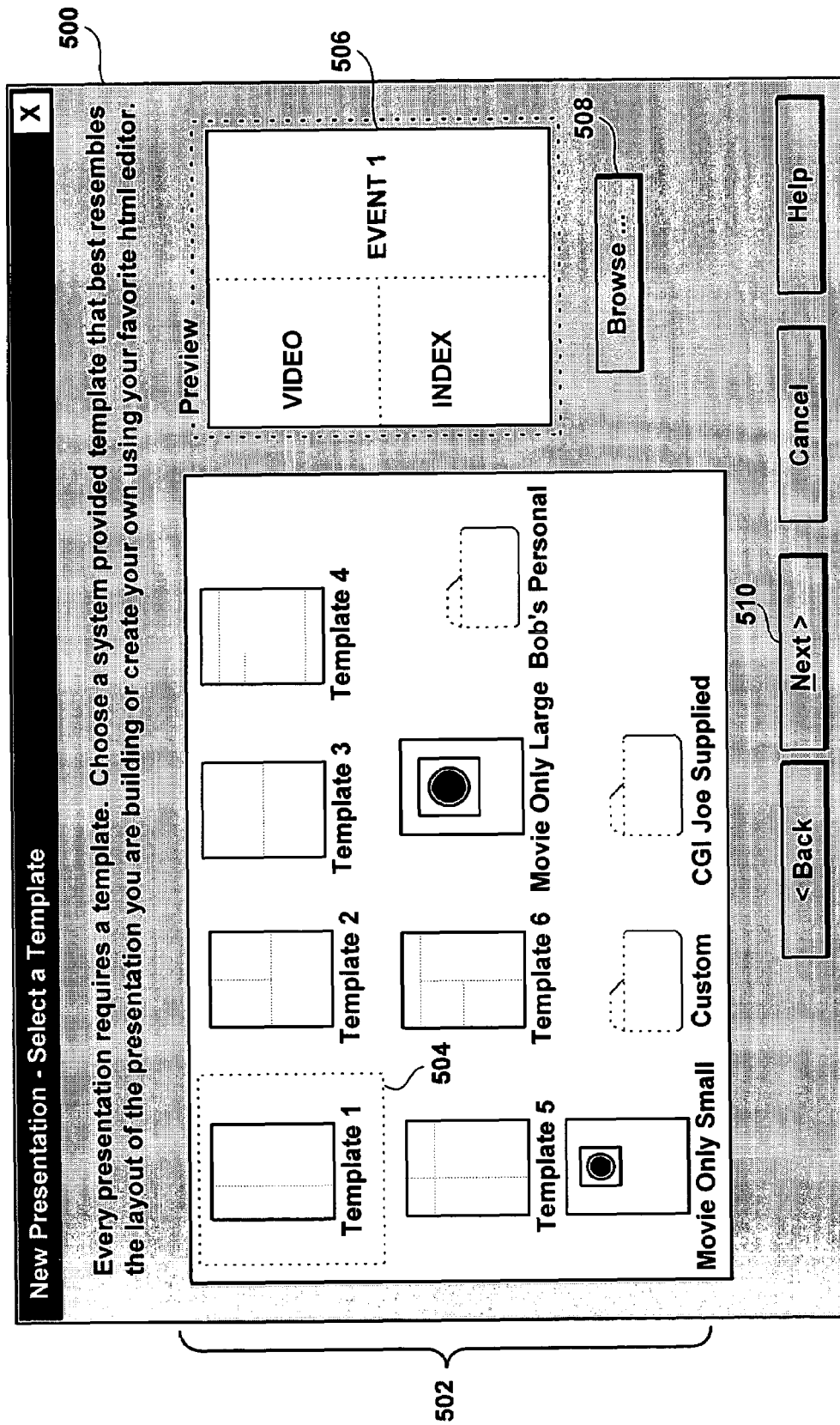
FIG. 5 is an illustration of an example graphical user interface for specifying a layout.

In FIG. 5, a graphical user interface 500 illustrates templates in a template window 502. A template defines a mapping between frames and tracks and a display arrangement of the frames such as described in FIG. 4. A selected template such as 504 is viewed in a preview pane 506. A user may browse the file system to identify other templates by selecting a button 508 as in conventional user interfaces. A template may be defined using the hypertext markup language (HTML), for example by using frame set definitions. A template may be authored using any conventional HTML authoring tool, word processor or text editor. In the user interface, a template file may be accessed to determine its frame set definitions to generate an appropriate icon for display. Similarly, the preview pane 506 is generated by accessing the frame set definition within the selected template file. The mapping between frames and tracks also is stored in the template file.

An example template file follows:

<HTML>

<AVIDPUB tagtype="framemap" framename="Frame_A" feature="MOVIE" originalurl="static.htm">

<AVIDPUB tagtype="framemap" framename="Frame_B" feature="EVENTTRACK" featurenum="1">

<AVIDPUB tagtype="framemap" framename="Frame_C" feature="EVENTTRACK" featurenum="2">

<AVIDPUB tagtype="framemap" framename="Frame_D" feature="TOC" originalurl="static.htm">

<AVIDPUB tagtype="framemap" framename="Frame_E" feature="EVENTTRACK" featurenum="3">

<AVIDPUB tagtype="framemap" framename="Frame_Top" feature="STATICHTML" featurenum="0" originalurl="header.htm">

<FRAMESET cols="40%, 60%" bordercolor="blue" frameborder=yes framespacing=2>
  <FRAMESET rows="70, 40%,*">
  <FRAME SRC="header.htm" name="Frame_Top">
  <FRAME SRC="AvidVid.htm" name="Frame_A">
  <FRAME SRC="AvidPubToc.html" name="Frame_D">
  </FRAMESET>
  <FRAMESET rows="33%, 34%,*">
  <FRAME SRC="static.htm" name="Frame_B">
  <FRAME SRC="static.htm" name="Frame_C">
  <FRAME SRC="static.htm" name="Frame_E">
  </FRAMESET>
</FRAMESET>
</HTML>

The first few lines of this template include "<AVIDPUB>" HTML elements. These elements keep track of the mappings between frames and tracks. Following these elements, a frame set definition is provided using the "<FRAMESETS>" element. Each frame has a source file name (SRC="filename") and a name (name="name") associated with it. Each <AVIDPUB> element maps a frame name to a "feature," which is a name of a type of a track, and a feature number, indicative of which of the number of tracks of that type is mapped to the frame.

A template may include other content and structure beyond that shown in the example. For example, a company may want all of its presentations to use the same logo in the same position. This consistency may be provided by adding a reference to the logo to the template.

Figure 6:
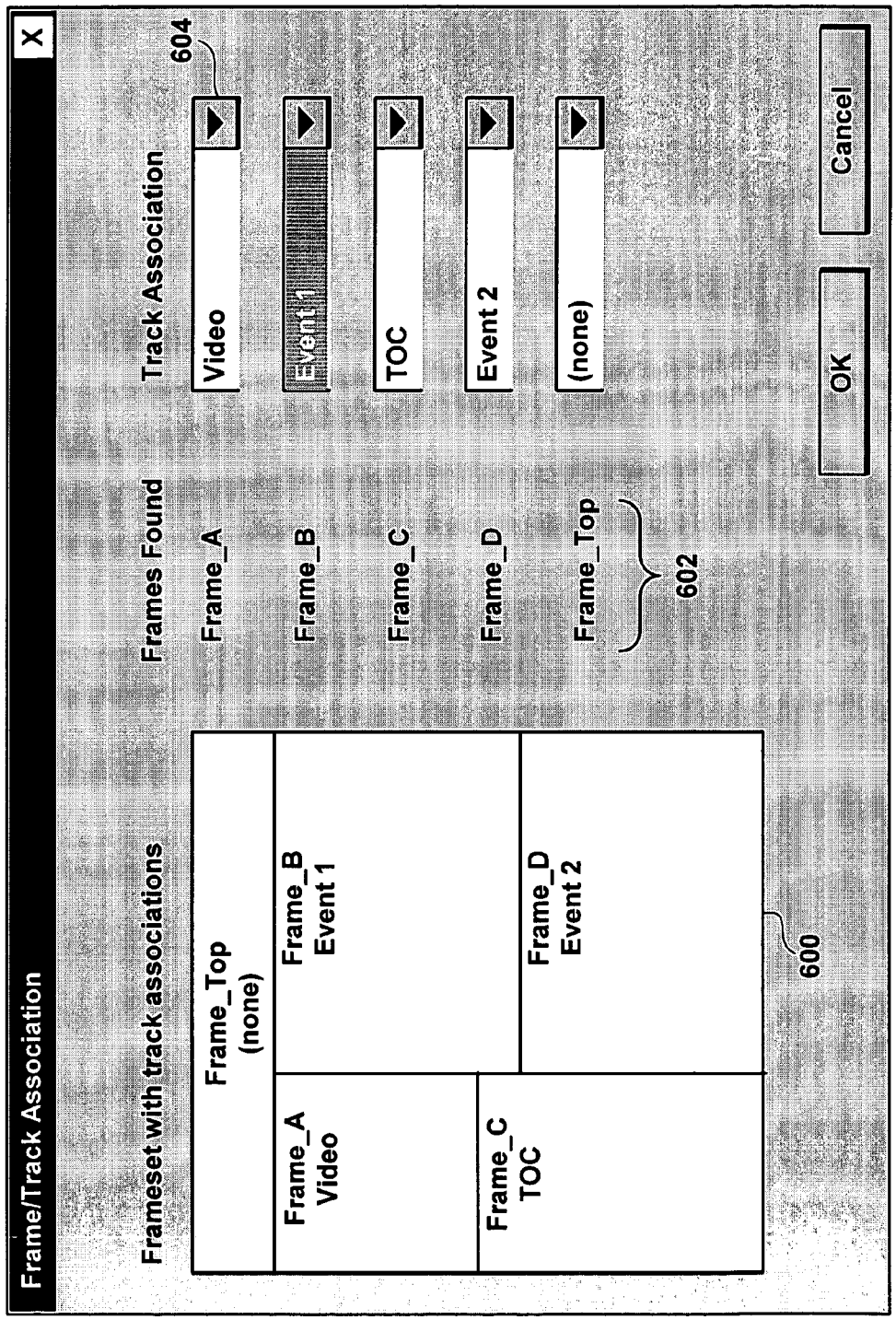
FIG. 6 is an illustration of an example graphical user interface for specifying a mapping between frames in a layout and tracks in a timeline.

By selecting the next button 510 in FIG. 5, the mapping between frames and tracks may be defined. A user interface such as shown in FIG. 6 is then displayed. The system uses the template HTML file to generate a view 600. Also, the frame names are extracted from the selected template and are listed in a region 602. The available tracks for a presentation are accessed, possibly using the timeline, to generate menus such as indicated at 604. The name of each track is put into a menu associated with each frame name to enable a user to select that track and associate it with the corresponding frame. If a track is associated with a frame, the <AVIDPUB> element for that frame has its feature attribute modified to indicate the track is associated with that frame. A check may be performed to ensure that a track is not associated with more than one frame.

In this and other processes described below in which an HTML file is read and accessed, an application programming interface provided by the Microsoft Corporation used may be to read and write data in HTML files.

Having now described examples of data structures for timelines and layout specifications how they may be defined and how they may be associated with each other, authoring and publishing of such presentations will now be described.

Figure 7A:
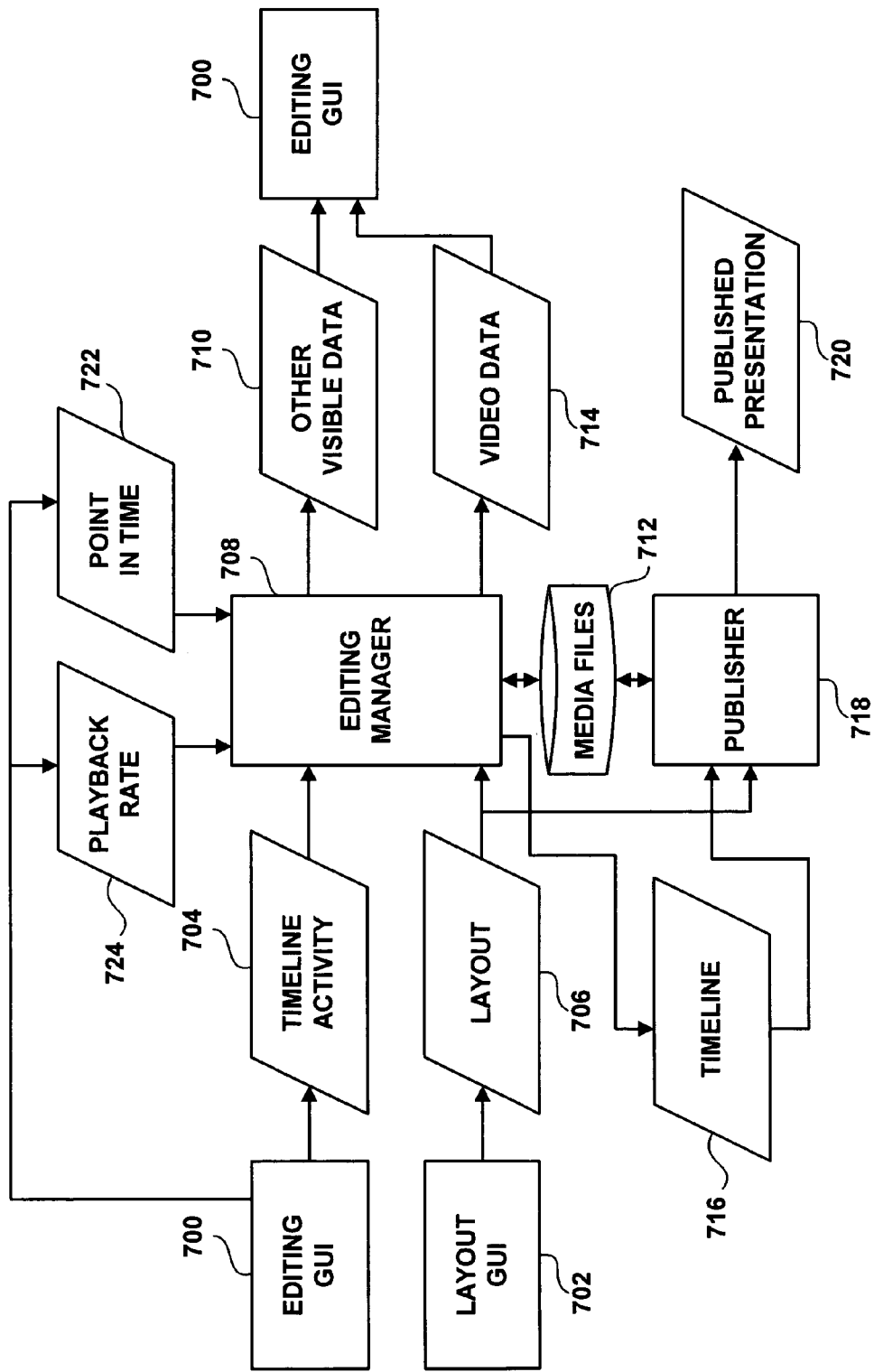
FIG. 7A is a data flow diagram illustrating a relationship of parts of a system for authoring and publishing a multimedia presentation.

FIG. 7A is a data flow diagram illustrating a relationship of parts of a system for authoring and publishing a multimedia presentation. Using an editing graphical user interface (GUI) 700 described below with FIG. 7B and a layout GUI 702, described above with FIG. 6, timeline activity 704 and a layout specification 706 are defined. This data is provided to an editing manager 708 to enable viewing of the presentation during editing. The editing manager, given a point in time 722 on the timeline and optionally a playback rate 724 form the editing GUI 700, generates video data 714 and other visible data 710 for display in the editing GUI 700, in an arrangement defined by the layout specification 706, using media files 712. An example implementation of the editing manager is described below in connection FIGS. 8A-F. After the author has completed creating the presentation, the publisher 718 is invoked to process the timeline 716, layout specification 706, and media file 712 to generate the published presentation 720.

Figure 7B:
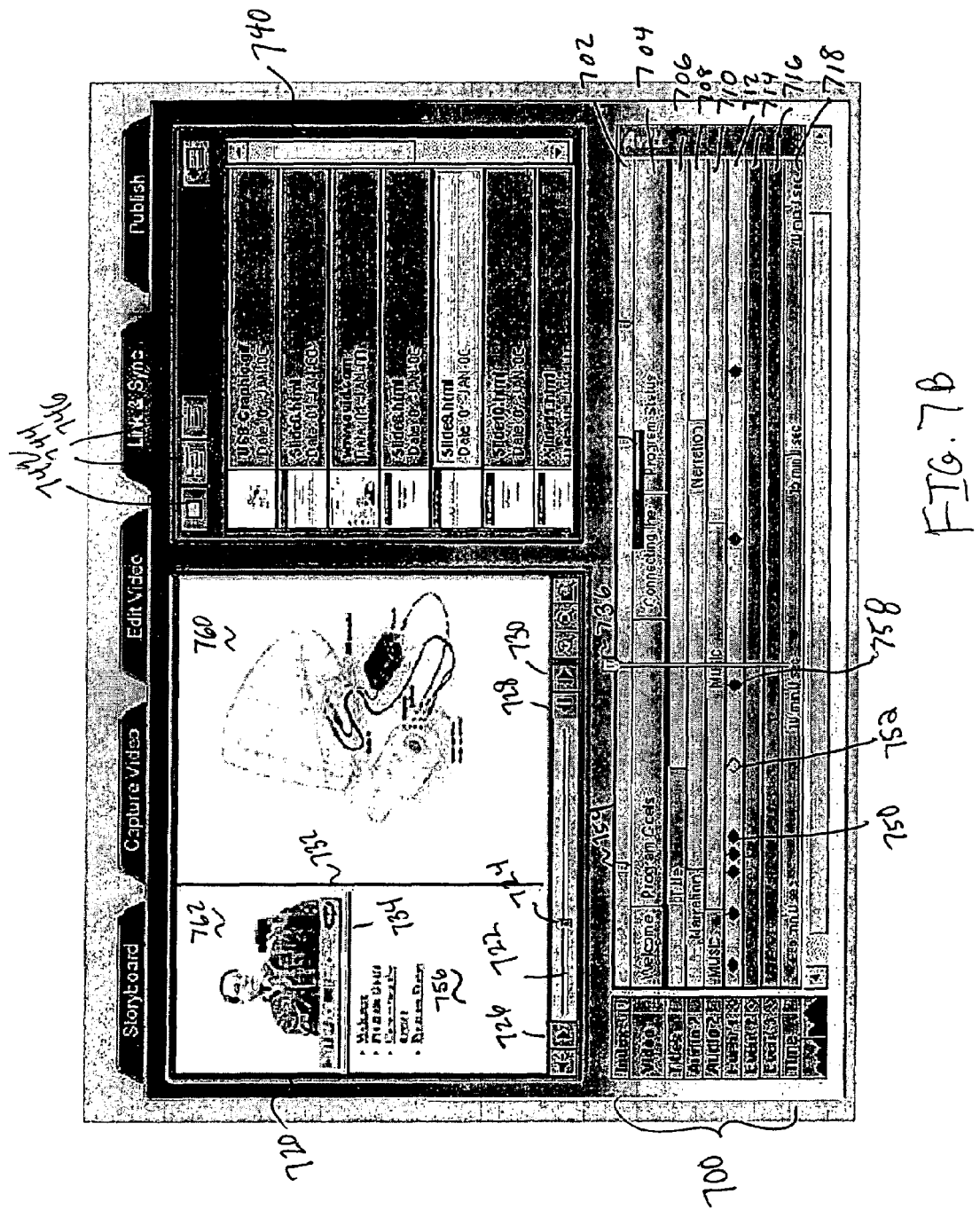
FIG. 7B is an illustration of an example graphical user interface for interactively authoring and viewing a presentation.

An example GUI for the editing GUI of FIG. 7A will now be described in connection with FIG. 7B. In FIG. 7B, the timeline region 700 includes an index track 702, a video track 704, a titles track 706, two audio tracks 708 and 710, three event tracks 712, 714 and 716 and the timeline scale 718. The timeline scale determines the number of pixels that represents a time unit. Increasing or decreasing this time scale allows the user to focus on a particular location in the composition, or to have a more of an overview of the composition. A viewer window 720 displays the video data and other visual information. A display controller 722 includes a position indicator 724 which points to the present position within the multimedia presentation which is being viewed. Forward and backward skip buttons 726 and 728 and =play buttons 730 also may be provided. The position indicator 724 is associated with a position indicator 736 in the timeline 700. The buttons 726, 728 and 730, and position indicator 724 may be used to control the viewing of the multimedia presentation during authoring. Frame boundaries, as indicated at 732 and 734, to the frame set definitions in the layout specification. The frame boundaries 732 and 734 may be made adjustable using a cursor positioning device, such as a mouse or touchpad. Such adjustments may be transformed into edits of the layout specification. The various kinds of operations that may be performed to edit the audio and video and to add titles are described in more detail in PCT Publication No. WO98/05034.

How entries in the index or table of contents track 702 and event tracks 712 through 716 are added or modified will now be described. A region 740 illustrates available multimedia data for insertion into events. Buttons 742, 744 and 746 enable different views of the information presented in region 740. Button 742 selects a mode in which the system displays a picture of the data. Button 744 selects a mode in which the system displays a detailed list including a small picture, filename, and timestamp of the data file or resource. Button 746 selects a mode in which the system displays only titles. Other modes are possible and the invention is not limited to these. The names displayed are for those files found in the currently active path in the file system used by the authoring tool or other resources available to the system. The list operation, for example, may involve a directory lookup performed by the computer on its file system. A user may select an indicated data file or resource and drag its icon to an event timeline either to create a new event, or to replace media in an existing event, or to add media to an existing event.

On the event timeline, an event 750 indicates a data file or other resource associated with a particular point in time. Event 752 indicates that no file or resource is associated with the event at this time. In response to a user selection of a point on an event track, a new event may be created, if one is not already there, or the selected event may be opened. Whether a new event is created, or an existing event is opened, the user may be presented with a properties dialog box to enable entry of information, such as a name for the event, or a file name or resource locator for the associated media, for storage into the event data structure. An event that is created may be empty, i.e., might not refer to any data file or resource.

The elements on the event track may be illustrated as having a width corresponding to the amount of time it would take to download the data file over a specified network connection. To achieve this kind of display, the number of bytes of a data file is divided by the byte-per-second rate of the network connection to determine a time value, in seconds, which is used to determine the width of the icon for the event to be displayed on the event track. Displaying the temporal width of an object provides information to the author about whether enough time is available at the location of distribution to download the data and to display the data at the desired time.

Similar to the events, a user may select an element on the table of contents track as indicated at 754. An item may be added by selecting a point on the table of contents track with a cursor control device. Upon selection, a dialog window is displayed through which the user may enter text for the selected element. Each of the elements in the table of contents track 702 is displayed in the frame 756 in the viewer 720.

To display the presentation to the author, for a given point in time of the presentation, the system determines which contents should be displayed. In the example shown in FIG. 7B, event 758 is currently being displayed from the event track in viewer frame 760. The video is being shown in frame 762. The table of contents elements are shown in frame 756. A viewer such as shown in FIGS. 7A and 7B may be implemented in many ways, depending on the availability of pre-existing program components to be used, and the platform on which the viewer is implemented. An example implementation will now be described in connection FIGS. 8A through 8E for use with a platform as specified below. In this implementation, the viewer uses an Internet Explorer browser component, available from Microsoft Corporation, to render the nontemporal media. Currently available browser components are capable of processing encoded streaming media files but not video and audio data defined using a timeline. Thus, the temporal media, in particular the audio and video, is rendered in a manner typical in video editing systems, such as described in PCT Publication No. WO98/05034. The viewer described herein reads a presentation and accesses data, audio and video files to produce an the presentation without an encoded streaming media file, thus simulating the operation of a browser that uses streaming media files.

Figure 8A:
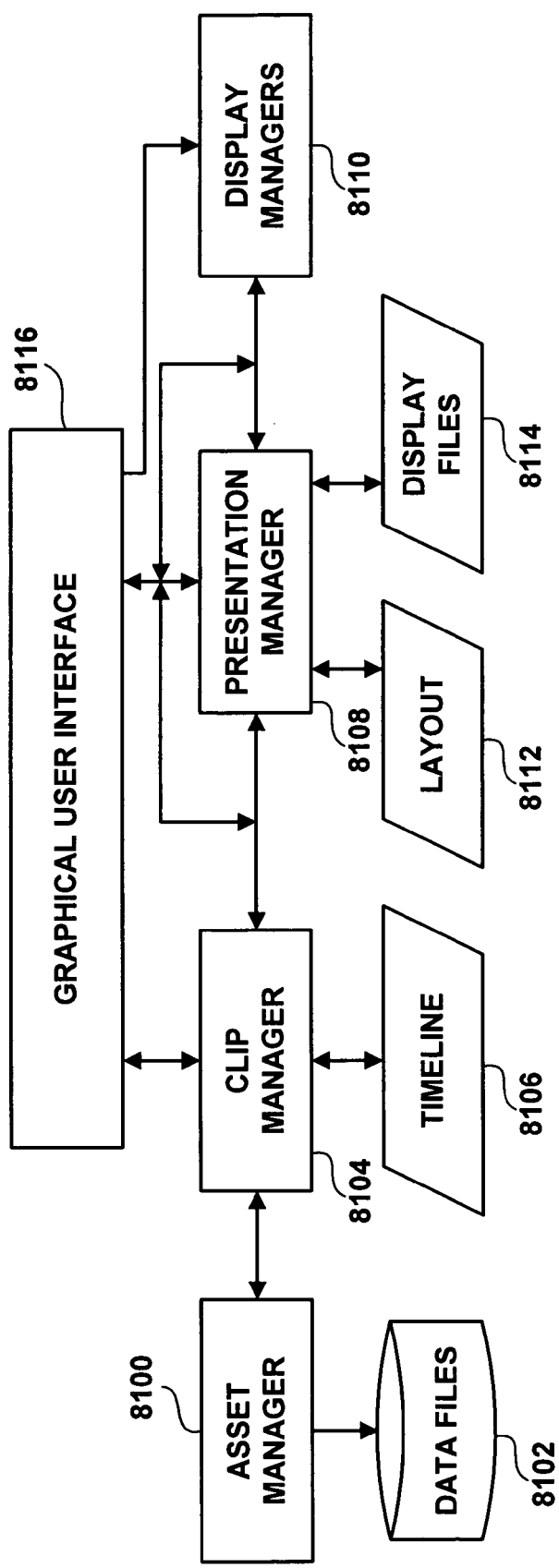
FIG. 8A illustrates an architecture for implementing an editing viewer of FIG. 7A.

Referring now to FIG. 8A, an architecture for this implementation is illustrated. This architecture includes an asset manager 8100 which manages access to data files 8102 used in the presentation. A clip manager 8104 maintains the timeline data structure 8106 in response to instructions from the user via the graphical user interface. Requests for access to information from the timeline 8106 by the presentation manager 8108 and display manager 8110 also are managed by the clip manager 8104. The presentation manager 8108 maintains the layout specification 8112 and other display files 8114. The other display files include files in a markup language that define the table of contents frame and the video frames. An example layout was described above in connection with FIG. 6. An example table of contents file and example video frame files, for the Real Media and Windows Media technology formats, are provided in Appendices I-III, the interrelationship of which will now be described.

There are several ways in which the table of contents may be constructed to allow actions on a table of contents entry to cause a change in the playback position in the video frame. One example is provided by the source code and Appendices I-III. In the table of contents page, a JAVA script function called "seekToEPMarker" takes either a marker number (for Windows Media technology) or a time in milliseconds (for Real Media) and calls a function "seekToVideoMarker" of its parent frame in its frame set. This function call actually calls the JAVA script function of the child frame of the table of contents' parent frame that includes the video player. That function receives the marker and the time in milliseconds and generates the appropriate commands to the media player to initiate playback of the streaming media from the designated position.

Turning again to FIG. 8A, the display managers 8110 each are associated with a display window in the viewer and control displaying content in their respective windows. In general, the display managers access data from the presentation manager 8108 and clip manager 8104 to provide data to the graphical user interface 8116, in response to events that modify the timeline or the presentation of data in the timeline as received from the graphical user interface or the clip manager. The graphical user interface 8116 communicates with the clip manager, presentation manger and display manager to create and maintain the view of the timeline and the presentation in response to user inputs.

Figure 8B:
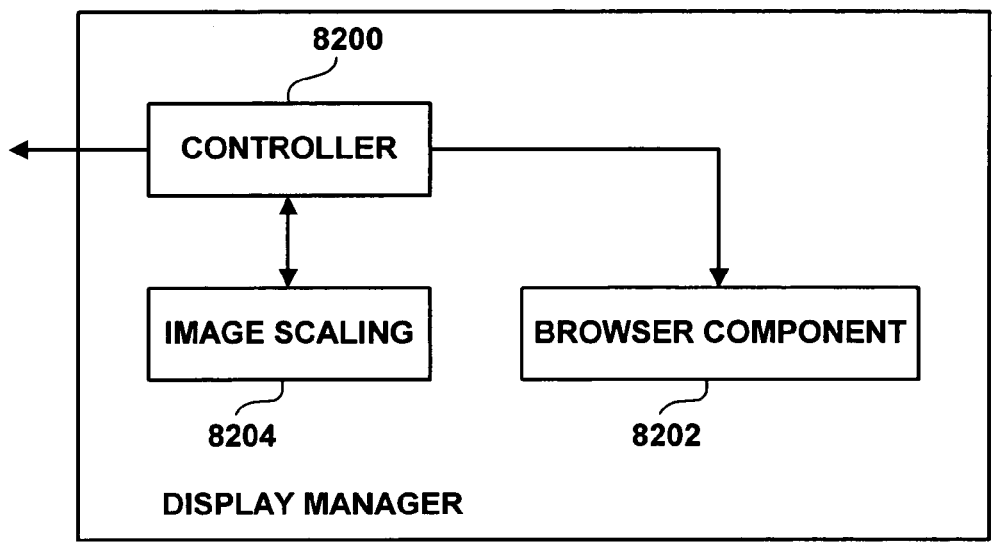
FIG. 8B illustrates an architecture for implementing a display manager of FIG. 8A.

A display manager, in one implementation, is described in more detail in connection with FIG. 8B. The display manager includes a controller module 8200 which communicates with the graphical user interface, presentation manager and clip manager. To display a data file, the controller instructs a browser component 8202 to render data for display. The output of the browser component is processed by an image scaling module 8204 that scales the result to fit within the appropriate display region in the viewer.

Figure 8C:
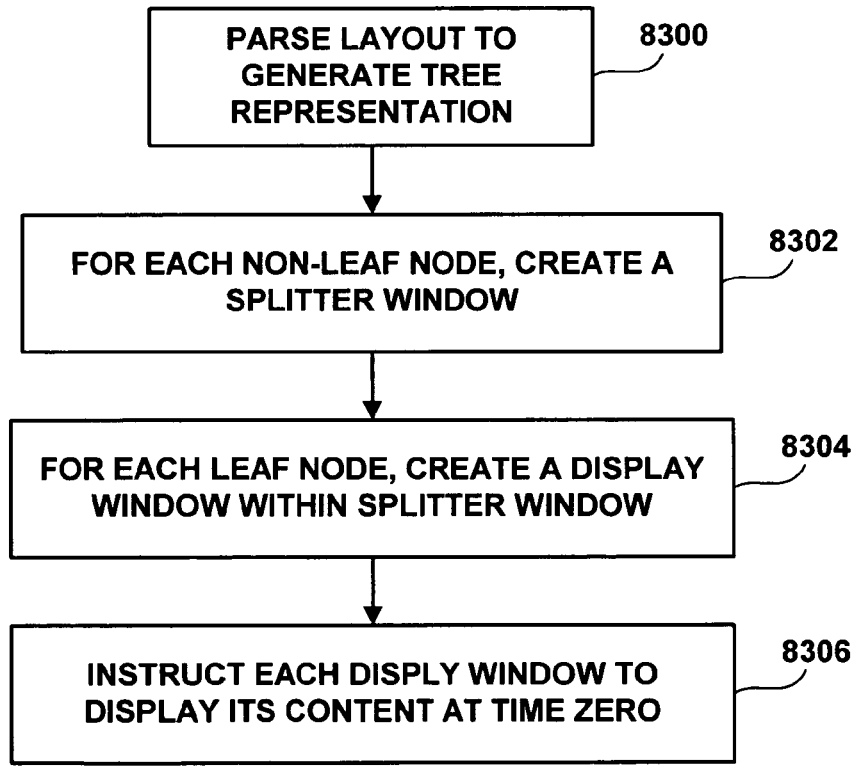
FIG. 8C is a flowchart describing how a graphical user interface may be constructed.

Referring now to FIG. 8C, how the display of the presentation in the viewer may be created will now be described. In particular, the layout of the presentation is defined by the layout specification 8112. This layout specification is parsed 8300 to generate a tree-like representation of the layout. In particular, as shown in the example layout specification provided above, some frames are defined as subframes of other frame sets. This hierarchical definition of frames translates into a tree-like representation. For each nonleaf node in the tree, a splitter window is created 8302 in the presentation display region on the user interface. For each leaf node in the tree, a display window is created 8304 within its associated splitter window. This display window is instructed 8306 to display its content at time zero, i.e., the beginning, in the presentation to initialize the display. The display window has an associated display manager 8110.

Figure 8D:
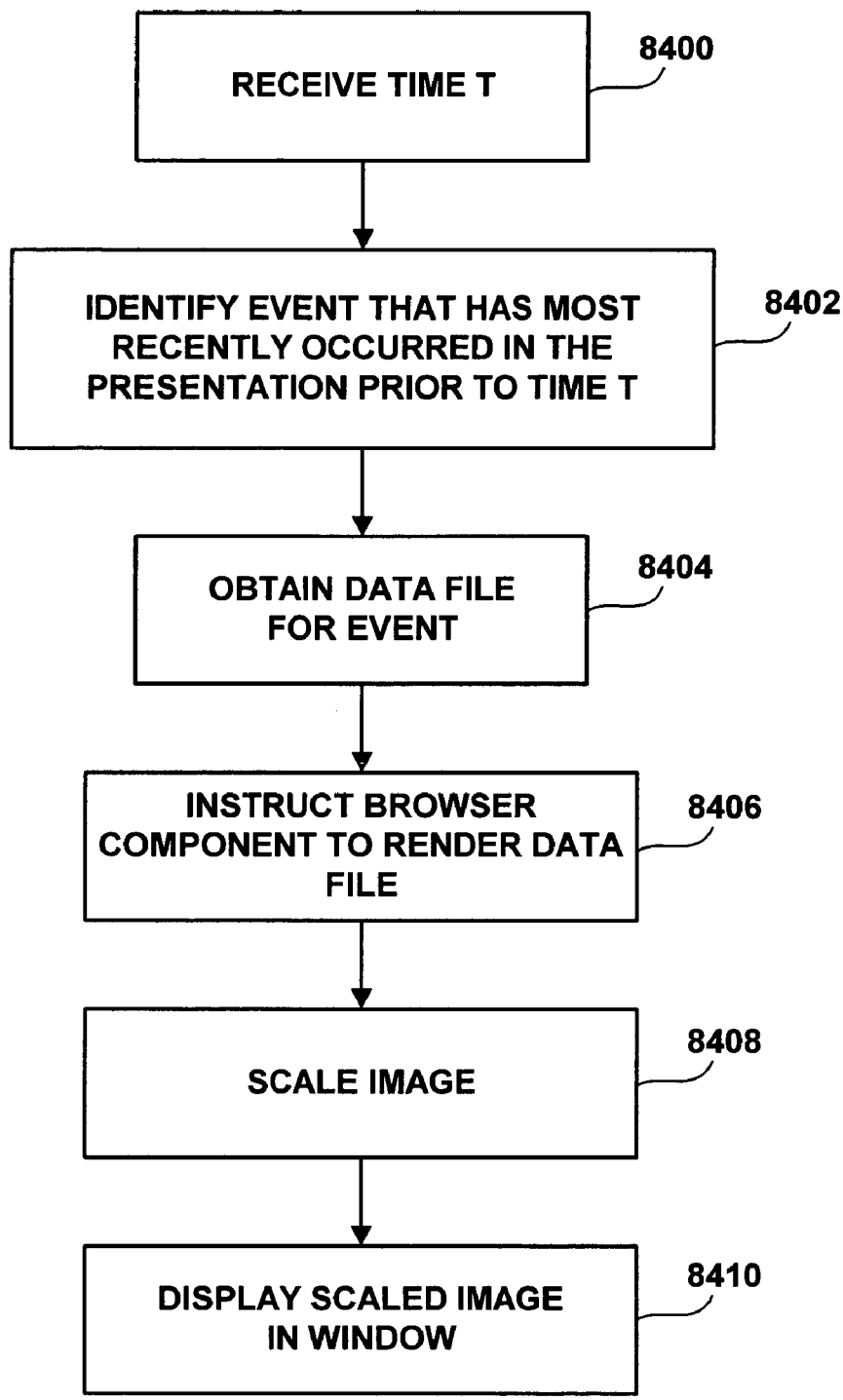
FIG. 8D is a flowchart describing how a display manager may display contents and its corresponding portion of the editing interface.

How the display manager displays data given a specified time in the presentation will now be described in connection with FIG. 8D. In particular, the display manager receives 8400 a time T. For event tracks, the event that has most recently occurred in the presentation prior to time T is identified 8402. The data file for that event is then obtained 8404. The browser component is then instructed 8406 to render the received data file. The image scaling module scales the image produced by the browser component, in 8408, which is then displayed 8410 in the associated window. For video information, this process involves identifying the sample from the data file for the segment that is in the presentation at the specified time. This sample is scaled and displayed. Because the table of contents file is not time dependent, it is simply rendered, scaled and displayed and step 8402 may be omitted.

After initialization, each display manager acts as a "listener" process that responds to messages from other components, such as the clip manager and graphical user interface, to update the display. One kind of update is generated if display controls in the graphical user interface are manipulated. For example, a user may modify the position bar on either the timeline or the viewer to initiate display from a different point in time T. In response to such a change, the graphical user interface or the clip manager may issue a message requesting the display managers to update the display given a different time T. Similarly, during editing, changes to the timeline data structure at a given point in time T cause the clip manager to instruct the display managers to update the display with the new presentation information at that point in time T.

Playback may be implemented using the same display mechanism. During either forward or reverse playback at a continuous or user-controlled rate, a stream of instructions to update the display at different points in time T may be sent to the display managers. Each display manager updates its region of the display at each of the specified times T which it receives from the clip manager or graphical user interface.

Figure 8E:
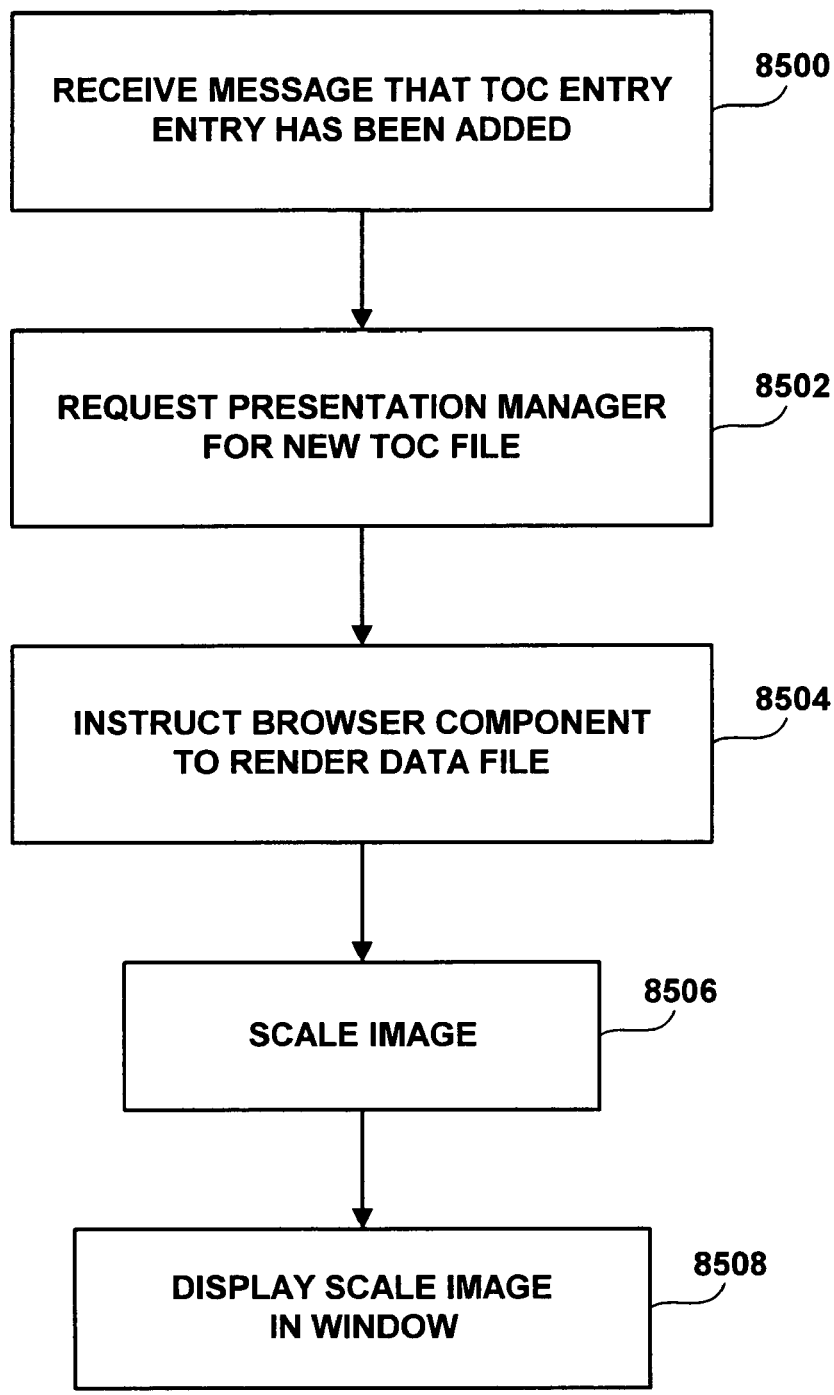
FIG. 8E is a flowchart describing how the table of contents display may be updated.

Although the table of contents generally is a single file without time dependency, during editing it may be modified, after which the display is updated. One implementation for modifying the table of contents display will now be described in connection with FIGS. 8E and 8F. In FIG. 8E, a display manager for the table of contents receives 8500 a message from the clip manager that a table of contents entry has been added to the table of contents track. The display manager requests 8502 the presentation manager for a new table of contents file. After receiving the indication of the new table of contents file, the browser component is instructed 8504 to render the data file. The rendered data file is then scaled 8506 and displayed 8508 in the window.

Figure 8F:
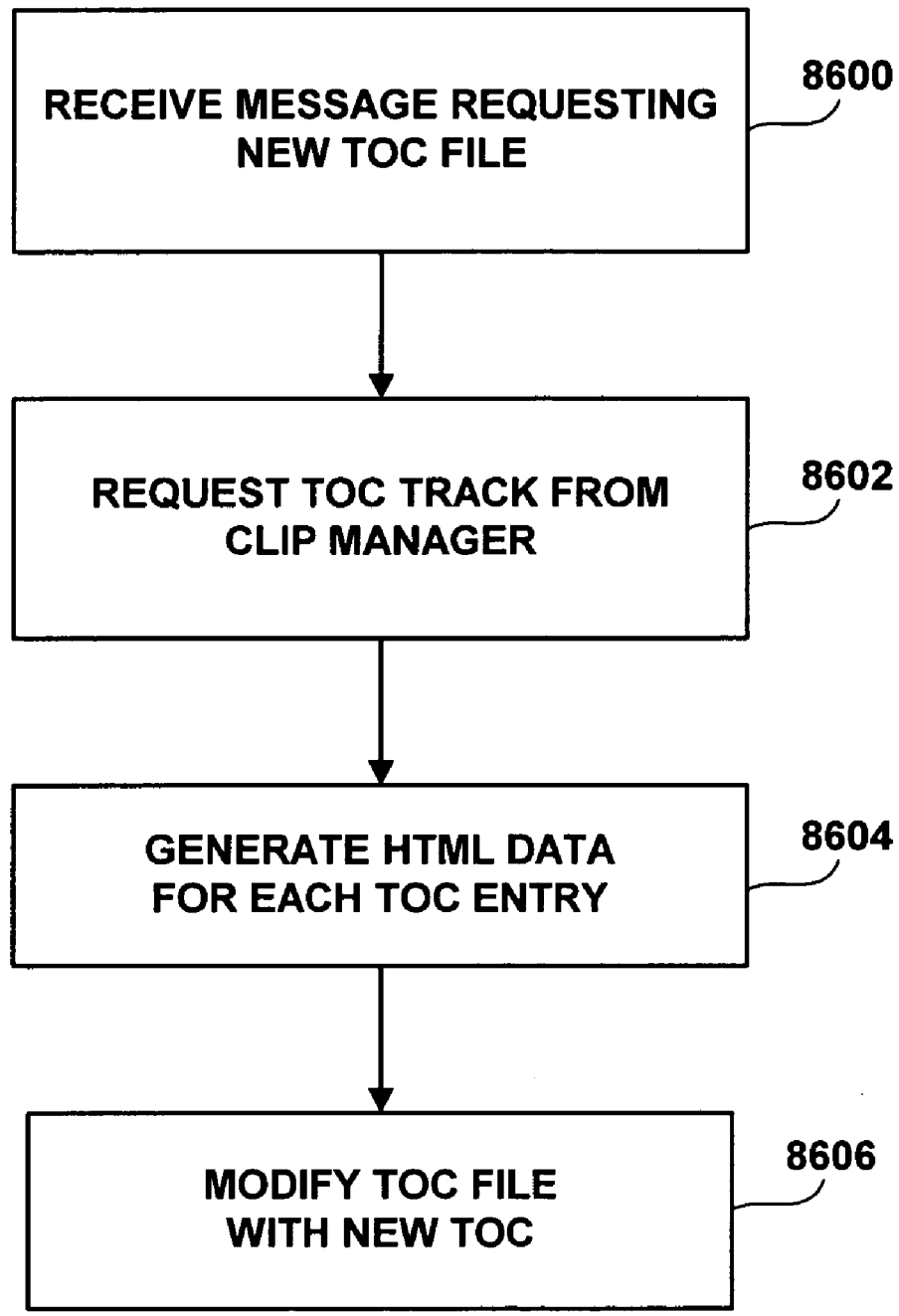
FIG. 8F is a flowchart describing how a new table of contents file may be generated.

How the presentation manager generates a new table of contents file is described in FIG. 8F. The presentation manager receives 8600 a message requesting a new table of contents file. The presentation manager requests 8602 the table of contents track information from the clip manager. HTML data is generated 8604 for each table of contents entry. Referring to the sample table of contents file in Appendix I, a list of items is created for each entry in the table of contents track. The table of contents file is then modified 8606 with the newly generated HTML, for example, by overwriting the table of contents information in the existing table of contents file. Although the identity of the table of contents file is known by the display manager, the presentation manager may return the name of the data file to confirm completion of the generation of the table of contents.

In one implementation, the display manager for each frame also may permit display of a zoomed version of the frame. In this implementation, selection of a frame for zooming causes the graphical user interface to display the data for this frame in the full display region. For video and events tracks, the zoom instruction merely changes the image scaling performed on the image to be displayed. For the table of contents track, the zoomed version may be provided by a display that enables editing of the table of contents. Modifications to the entries in the table of contents in the zoomed interface are passed back to the clip manager to update the timeline data structures.

After completing editing of a presentation, it may be published to its desired distribution format. A variety of operations maybe performed and assisted by the publishing component of this system to prepare a presentation for distribution. Operations that may be performed to publish a multimedia presentation will now be described in more detail in connection with FIG. 9.

First, the author provides setup data, which is accepted 900 through a GUI, to define the distribution format and other information used to encode and transfer the presentation.

For example, the selected output format may be a streaming media format, such as RealG2, Windows Media Technology, QuickTime or SMIL. Other settings for the encoder may include the streaming data file type, the video width, the video height, a title, author, copyright and keyword data.

For transferring the presentation, various information may be used to specify characteristics of one or more servers to which the presentation will be sent and any account information for those servers. Transfer settings may include a transfer protocol, such as file transfer protocol (FTP) or a local or LAN connection, for sending the presentation data files to the server. The server name, a directory at the server in which the media files will be copied, and optionally a user name and password also may be provided. A default file name for the server, and the HTTP address or URL of the server from which a user will access the published presentation, also may be provided. The server information may be separate for both data files and streaming media files.

This encoding and transfer information may be stored by the transfer tool as a named profile for later retrieval for transferring other presentations. Such profile data may include, for example, the data defining settings for encoding, and the data defining settings for transfer of encoded data files.

When setting up each of the connections for transfer, the connection also may be tested to confirm its operation. This test process involves transferring a small file to the destination and confirming the ability of the system to read the file from the destination.

After setup, the presentation may be audited 901 to reduce the number of errors that may otherwise result during the encoding and/or transfer processes. Profile information, described below, the presentation, and other information may be reviewed for likely sources of errors. For example, titles and/or other effects may be checked to determine whether the title and/or effect has been rendered. The timeline data structure may be searched to identify the data files related to each event, segment, table of contents entry, etc., to determine if any file is missing. The events in the timeline may be compared to the video or audio or other temporal data track to determine if any events occur after the end of the video or audio or other temporal data track. The layout specification also may be compared to the timeline data structure to ensure that no events or other data have been defined on tracks that are not referred to in the layout specification. Results of these various tests on the layout and timeline data structures may be provided to the user. Information about the profile used for the transfer process also may be audited. For example, whether passwords might be used on the target server, and the other information about the accessibility of the target server may be checked. The target directory also may be checked to ensure that no files in the native file format of the authoring tool are present in the target directory. Various other tests may be performed in an audit process and the invention is not limited thereto.

After optional auditing, the presentation is encoded 902 by transforming the timeline data structures into a format used by a standard encoder, such as provided for the Real Media Player or Windows Media Technology. Such encoding is described in more detail below in connection with FIGS. 11A and 11B. The encoded presentation optionally may be previewed 904. To support preview, during encoding the files used to encode, and that will ultimately be transferred to each server, are collected locally. The presentation may be encoded first to support preview by referring to the local files. The files for the presentation then are transferred 906 to each server. Before transfer, if the presentation was encoded for local preview, the references to local files are translated into references to files on the destination servers. For example, the encoded streaming media file generally is provided to a streaming media server, whereas other data files referred to by the streaming media file are provided to a standard hypertext transfer protocol daemon (HTTPD) or web server. The transfer process is described in more detail below in connection with FIG. 11C. Finally, the transferred presentation may be previewed 908 from the remote site.

Figure 9:
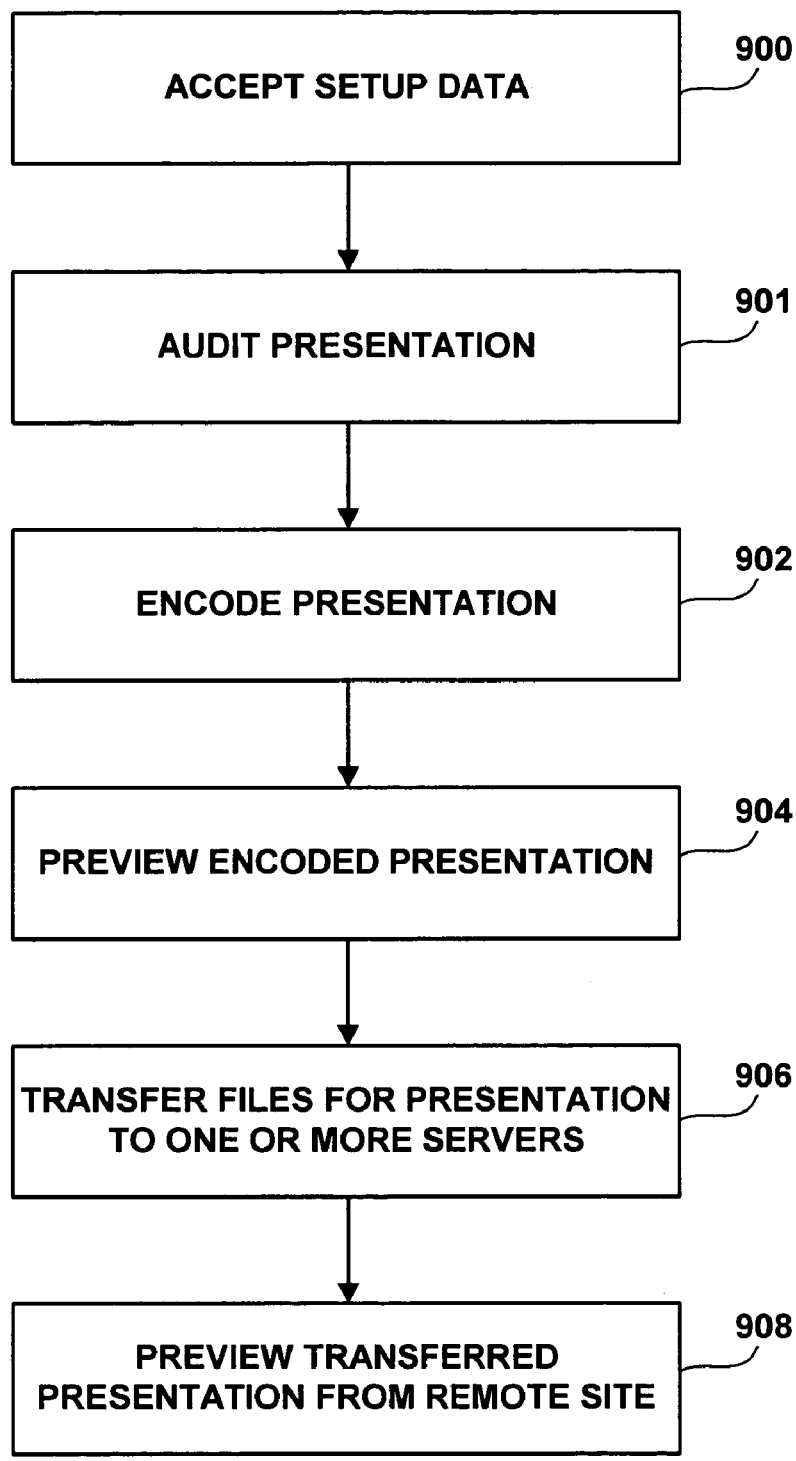
FIG. 9 is a flowchart describing how a presentation may be a published.
Figure 10:
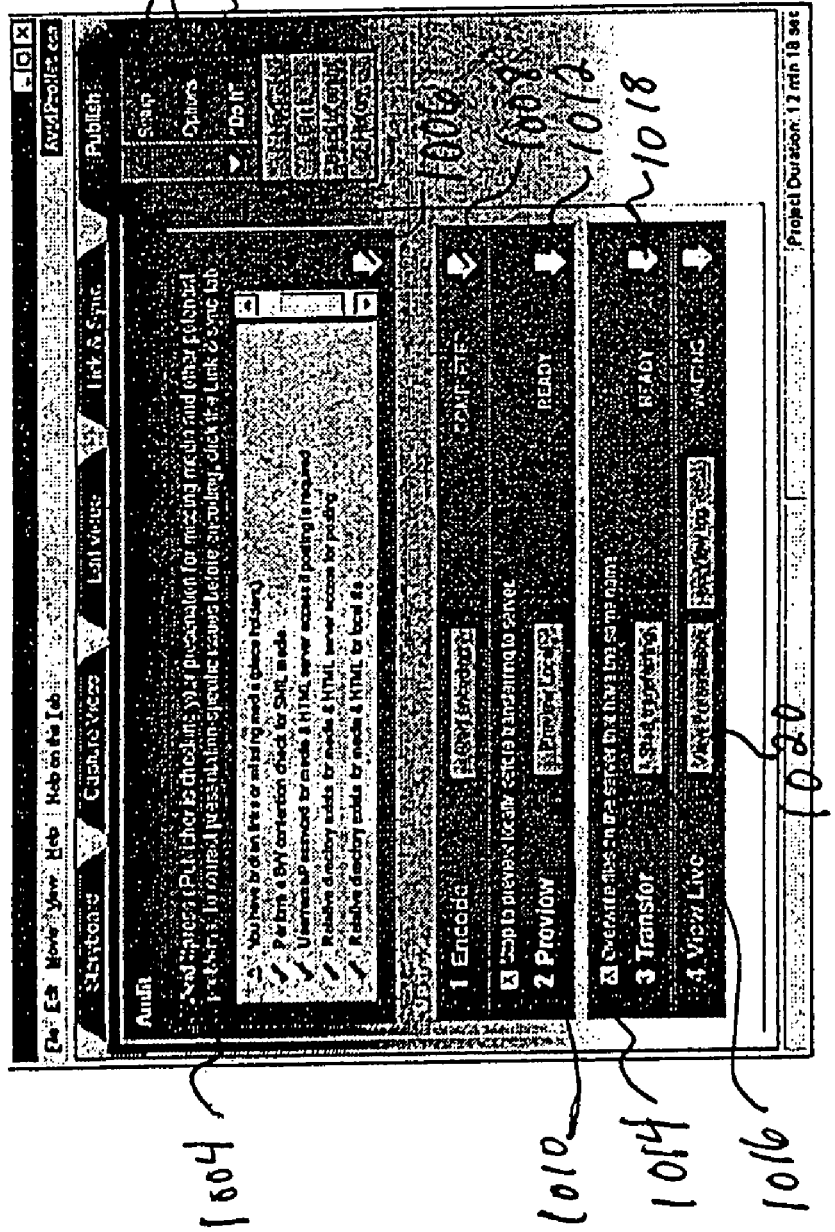
FIG. 10 illustrates a graphical user interface for managing a transfer process of a multimedia presentation.

A graphical user interface for facilitating the publishing process described in FIG. 9 will now be described in connection with FIG. 10. A user may set profile data by selecting setup or options 1000. During set up, a profile may be recalled, created or edited, and the user may specify the file folder and server on which the presentation will be stored. In response to selection of the "do it" menu item 1002, the screen shown in FIG. 10 is displayed. First the presentation and profile data are audited as shown at 1004. After the auditing step is complete, a checkmark appears in an icon 1006. Next, encoding of the presentation may be started at 1008. A user may optionally select to preview the encoded presentation locally prior to transfer. By selecting button 1010, a preview of the presentation may be initiated. After preview, the icon 1012 includes a checkmark. During transfer, a user may select to overwrite files that have the same name on the destination server, as indicated at 1014. The user may initiate the transfer by selecting the button indicated at 1016. After completion, the icon 1018 includes a checkmark. Finally, after transfer, the user may view the presentation as transferred from the destination server by selecting button 1020.

Figure 11A:
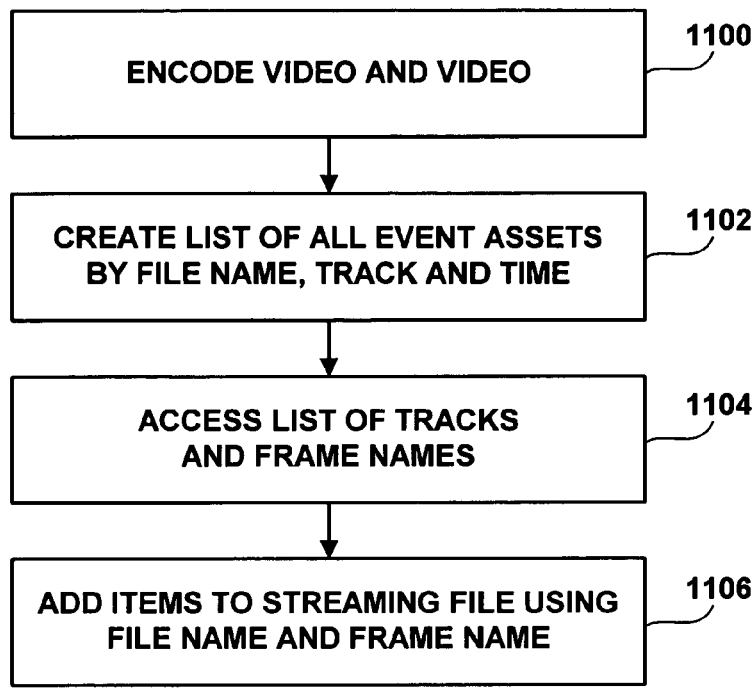
FIG. 11A is a flowchart describing how a presentation may be encoded.

Referring to FIG. 11A, encoding of a presentation will now be described. In general, most encoders have an application programming interface that generate an encoded file in response to commands to add samples of media to the presentation. The commands for adding samples generally include the type of media, the time in the presentation in which the media is to be added and the media data itself as inputs to the command. The sample for video data is usually a frame. The sample of audio data is usually several samples defining a fraction of a second. The data also may be, for example, a uniform resource locator (URL) or other data.

More particularly, an API has functions that: 1) enable opening the component, 2) optionally present the user with a dialog box interface to configure the component, 3) set settings of the component that control its behavior, 4) connect the component to a user visible progress bar and to the source of the data, 5) to initiate the component to start translating the data into the desired format, 6) write the desired format to a file, and 7) close the component if the process is complete. On the receiving side of the API, the system has code to respond to requests for data from the export or encode component. The export component generally accesses the time, track number, and file or URL specified by the user, which are obtained from the timeline data structure. To the extent that data interpretation or project-specific settings are used by the encoder, this information also may be made available through an API.

The video and audio may be encoded 1100 separately using standard techniques. The table of contents and event tracks are then processed. In particular, a list of event assets is generated 1102. An event asset is defined by its filename, track, and time in the presentation. The frame set is then accessed 1104 to obtain a list of tracks and frame names. The items in the event tracks are then added to the streaming media file using the filename for the event and the frame name for the event, at the indicated time for the event, in 1106. The filename for the event is its full path including either a full URL for remote files or an indicator of the disk volume for files that are accessed locally or over a local area network (LAN). In step 1106, the filenames and frame names inserted into the streaming media file are those in the destination to which the media file is being transferred. Therefore, the encoding is dependent in part on the transfer parameters. The list created in step 1102 may be sorted or unsorted.

Using Real Media, the table of contents track does not affect the streaming media file. Using Windows Media technology, however, marker codes are inserted for each table of contents entry, although no marker codes are inserted for events.

Figure 11C:
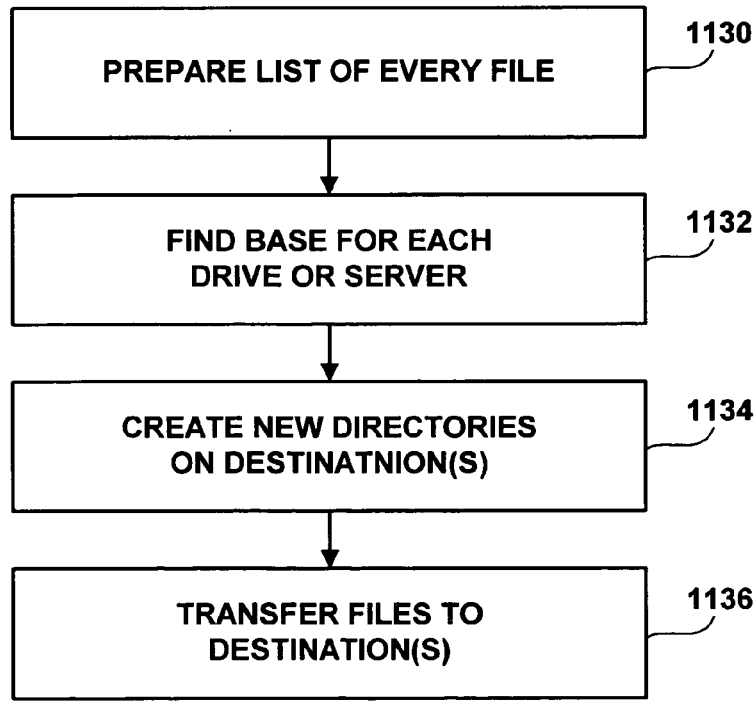
FIG. 11C is a flowchart describing how a presentation may be transferred.
Figure 11B:
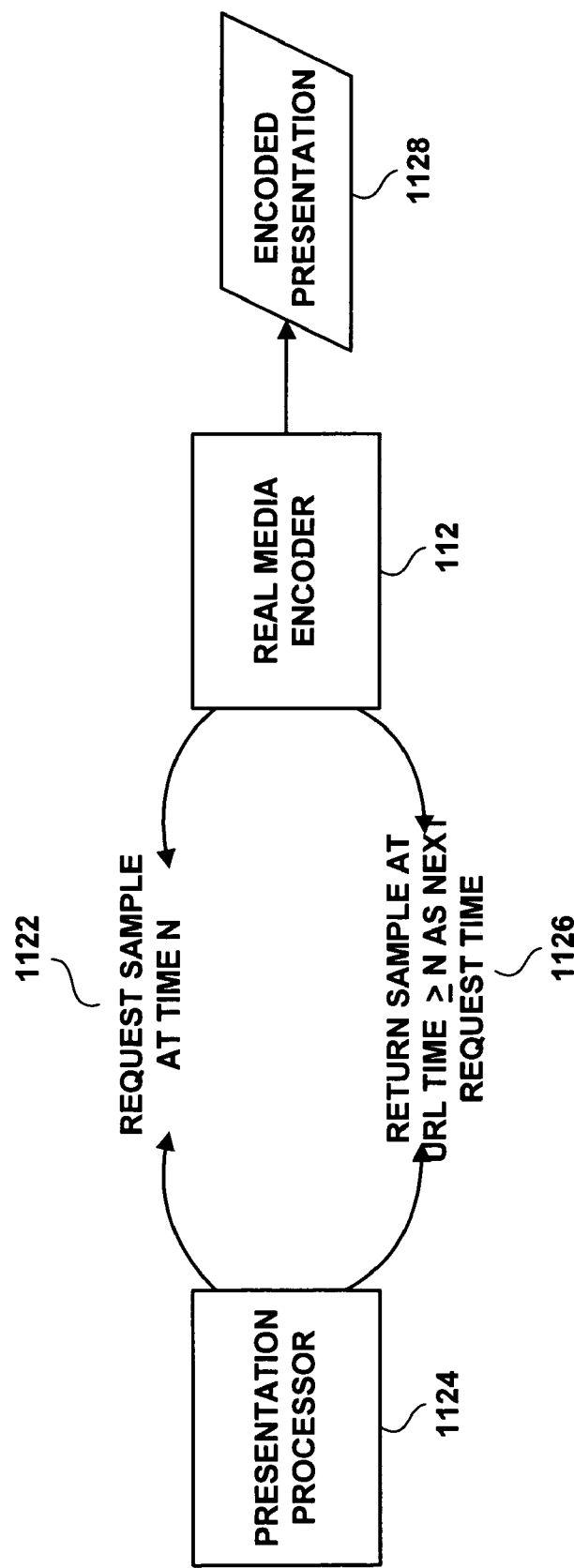
FIG. 11B is a flowchart describing, in one implementation, how a program may be encoded.

Referring to FIG. 11B, an implementation using the Real Media encoder will now be described. A Real Media encoder 112 issues requests 1122 for samples at a specified time. In response to these requests, a presentation processor 1124 implements the process described in FIG. 11A, and returns a sample 1126 from an event that occurs in the presentation at a time closest to and after the requested time. The response 1126 also indicates a time at which the encoder 112 should request the next sample. This time is the time corresponding to the sample which was returned by the presentation processor 1124. The list of event assets created in 1102 in FIG. 11A may be sorted prior to initiating encoding with the encoder 112, or may be sorted on the fly in response to requests 1122 from the encoder 112. After the end of the presentation is reached, the encoded presentation 1128 is available.

The process of transferring data to the servers will now be described in connection with FIG. 11C. After setup and encoding have been completed, the transfer of the presentation starts with preparing 1130 lists of files or resources of the presentation. A first list includes the table of contents file, the video frame file and the index or template file and all of the files that these three files directly reference. A second list is all files destined for the streaming media server. A third list is all of the files and resources in events and all of the files and resources these events reference directly. Resources that are not directly available at the local machine may be omitted from the list. This third list uses the complete path name or URL for the file or resource. For the drives or servers used for the files in the third list, a base path is found 1132. New directories on the destination servers are then created 1134 using the base paths as subdirectories of the target directory on the server. Files is all three lists are then transferred 1136 to their respective destinations.

A computer system with which the various elements of the system described above, either individually or in combination, may be implemented typically includes at least one main unit connected to both one or more output devices which store information, transmit information or display information to one or more users or machines and one or more input devices which receives input from one or more users or machines. The main unit may include one or more processors connected to a memory system via one or more interconnection mechanisms. Any input device and output device also are connected to the processor and memory system via the interconnection mechanism.

The computer system may be a general purpose computer system which is programmable using a computer programming language. Computer programming languages suitable for implementing such a system include procedural programming languages, object-oriented programming languages, combinations of the two, or other languages. The computer system may also be specially programmed, special purpose hardware, or an application specific integrated circuit (ASIC).

In a general purpose computer system, the processor is typically a commercially available processor which executes a program called an operating system which controls the execution of other computer programs and provides scheduling, debugging, input/output control, accounting, compilation, storage assignment, data management and memory management, and communication control and related services. The processor and operating system defines computer platform for which application programs in other computer programming languages are written. The invention is not limited to any particular processor, operating system or programming language.

A memory system typically includes a computer readable and writeable nonvolatile recording medium in which signals are stored that define a program to be executed by the processor or information stored on the disk to be processed by the program. Typically, in operation, the processor causes data to be read from the nonvolatile recording medium into another memory that allows for faster access to the information by the processor than does the disk. This memory is typically a volatile, random access memory such as a dynamic random access memory (DRAM) or static memory (SRAM). The processor generally manipulates the data within the integrated circuit memory and may copy the data to the disk if processing is completed. A variety of mechanisms are known for managing data movement between the disk and the integrated circuit memory element, and the invention is not limited thereto. The invention is not limited to a particular memory system.

Such a system may be implemented in software or hardware or firmware, or any combination thereof. The various elements of this system, either individually or in combination, may be implemented as a computer program product including a computer-readable medium on which instructions are stored for access and execution by a processor. Various steps of the process may be performed by a computer processor executing instructions stored on a computer-readable medium to perform functions by operating on input and generating output.

Additionally, the computer system may be a multiprocessor computer system or may include multiple computers connected over a computer network. Various possible configurations of computers in a network permit access to the system by multiple users using multiple instances of the programs even if they are dispersed geographically. Each program or step shown in the figures and the substeps or subparts shown in the figures may correspond to separate modules of a computer program, or may be separate computer programs. Such modules may be operable on one or more separate computers or other devices. The data produced by these components may be stored in a memory system or transmitted between computer systems or devices. The plurality of computers or devices may be interconnected by a communication network, such as a public switched telephone network or other circuit switched network, or a packet switched network such as an Internet protocol (IP) network. The network may be wired or wireless, and may be public or private.

A suitable platform for implementing software to provide such an authoring system includes a processor, operating system, a video capture device, a Creative Labs Sound Blaster or compatible sound card, CD-ROM drive, and 64 Megabytes of RAM minimum. For analog video capture, the video capture device may be the Osprey-100 PCI Video Capture Card or the Eskape MyCapture II USB Video Capture Device. The processor may be a 230 megahertz Pentium II or Pentium III processor, or Intel equivalent processor with MMX Technology, such as the AMD-K6-III, or Celeron Processor with 128K cache, and may be used with an operating system such as the Windows 98/98SE or Millennium operating systems. For digital video capture, the video capture device may be an IEEE 1394 Port (OHCI compliant or Sony ILink). The processor may be a 450 megahertz Pentium II or Pentium III processor, or Intel equivalent processor with MMX Technology, such as the AMD-K6-III, or Celeron processor with 128K cache.

Figure 12:
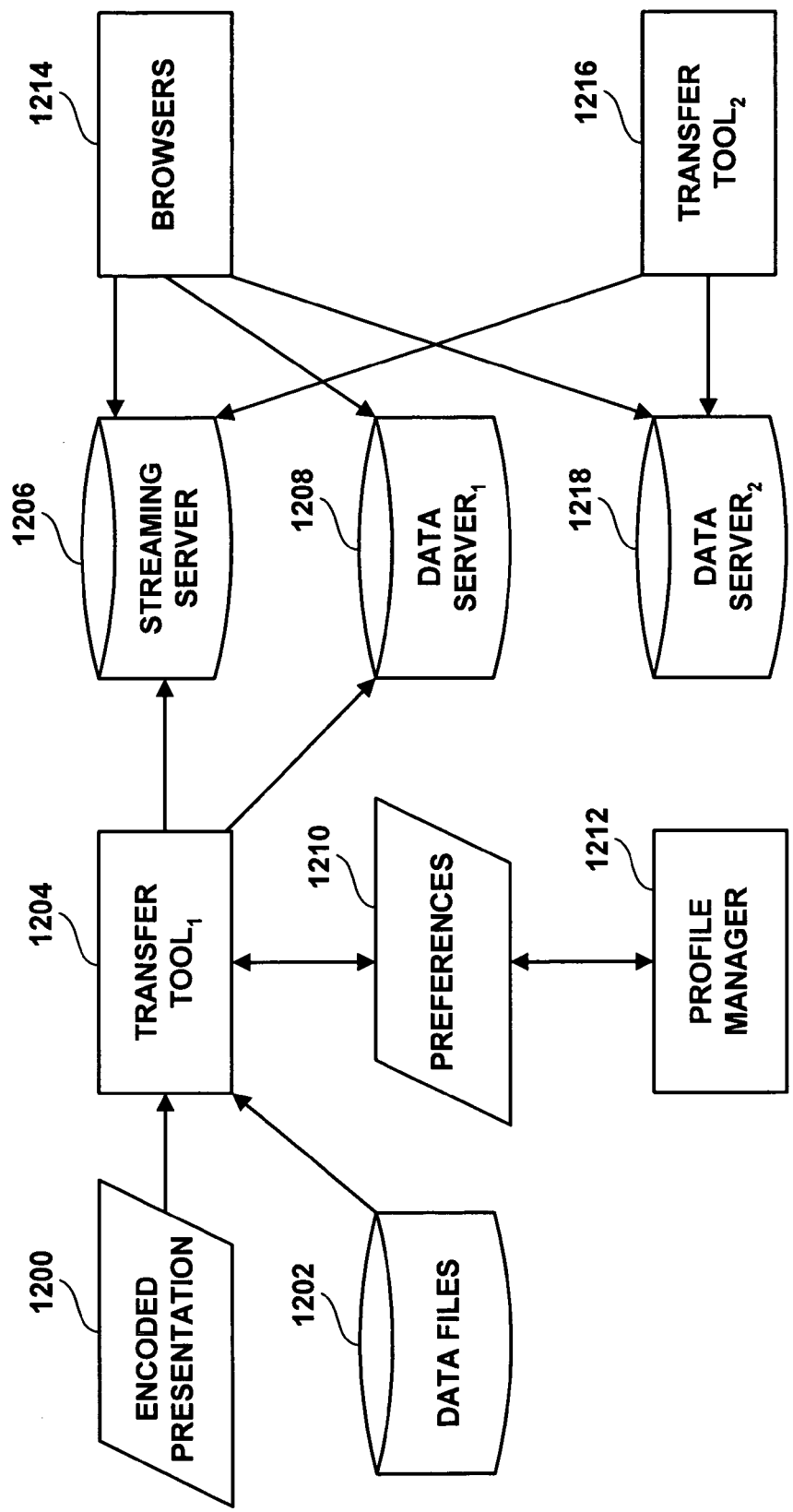
FIG. 12 is a data flow diagram illustrating interaction of a transfer tool with a streaming server and a data server.
Figure 13:
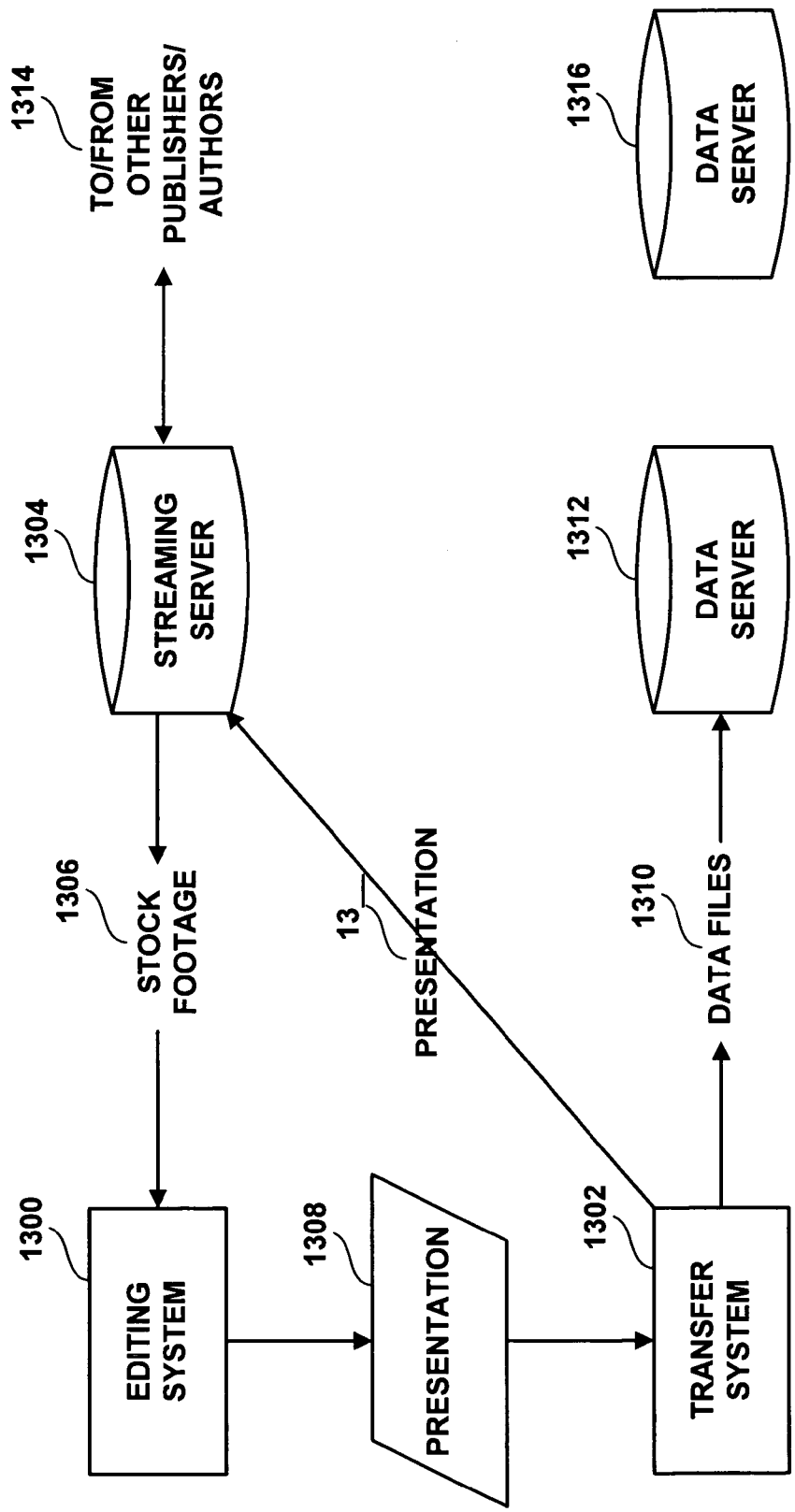
FIG. 13 is a data flow diagram illustrating a relationship of multiple editing and transfer systems with a streaming server.

Given an authoring tool such as described above, the use of multiple authoring tools by multiple authors for publishing data to a public or private computer network for access by other users will now be described in connection with FIGS. 12 and 13. In particular, an encoded presentation 1200 and associated data files 1202 may be transferred by a transfer tool 1204 to a streaming media server 1206 and a data server 1208. The transfer tool also may store preference data 1210 for the author with a profile manager 1212. The streaming media server 1206 and data server 1208 may be publicly accessible web servers accessible by web browsers 1214. Other kinds of distributed libraries of digital media, instead of a web server, also may be used to publish the presentation. If additional transfer tools 1216 are used by other authors, these transfer tools 1216 may transfer the streaming media to the same or a different streaming media data server 1206 as the other transfer tool 1204, but may have a separate data server 1218. Use of the same streaming media data server is possible where each transfer tool has access to the streaming media server 1206. Such access may be built into either the transfer tool or the authoring tool. The transfer tool and/or the authoring tool may be provided by the same entity or another entity related to the entity that owns or distributes the streaming media server 1206. The streaming media server may be implemented, for example, as described in U.S. patent application Ser. No. 09/054,761, which corresponds to PCT Publication No. WO99/34291. The streaming media server 1206 may charge authors for access to and/or for the amount of data stored on the steaming media server 1206.

In addition to publishing presentations to the media server, an authoring tool may use the media server or data server as a source of content for presentations. As shown in FIG. 13, for example, the editing system 1300, and optionally the transfer system 1302, may have access to one or more streaming servers 1304. The editing system may acquire stock footage 1306 from the streaming media server 1304 or other content from a data server 1312. Such stock footage, for example, may be purchased from the entity maintaining or owning the streaming server 1304. An author may add such stock footage to the presentation. The completed presentation 1308 may be in turn published by the transfer system 1302 to the streaming media server 1304 (as indicated by presentation 13), with data files 1310 stored on a data server 1312. Tools used by other publishers and authors, as indicated at 1314, also may access the streaming server 1304 for receiving stock footage or for publishing presentations. Such authors and publishers may use a separate data server 1316 for storing nontemporal data related to the temporal data published on the streaming server 1304.

Having now described a few embodiments, it should be apparent to those skilled in the art that the foregoing is merely illustrative and not limiting, having been presented by way of example only. Numerous modifications and other embodiments are within the scope of the invention.

APPENDIX I

```
<!DOCTYPE HTML PUBLIC "-//W3C//DTD HTML 4.0
Transitional//EN">
<HTML><HEAD><TITLE>Table of Contents Page</TITLE>
<SCRIPT language=JavaScript>
    <!--
        function seekToEPMarker (iWhichMarker, iTimeInMS)
        {
            var t = parent.Frame__A;
            if (t != null)
            {
                t.seekToVideoMarker(iWhichMarker,
                iTimeInMS)
            }
        }
    //-->
</SCRIPT>
<META content="text/html; charset=windows-1252" http-equiv=
Content-Type>
<META content="MSHTML 5.00.3013.2600" name=GENERATOR>
</HEAD>
<BODY bgColor=white link=black><!--flexible TOC without bullet-->
<!--
<AVIDTOCBEGIN tocstyle="custom" tocitem="<a href = %1>2%</a>">
--><!-- standard
TOC with bullet--><AVIDTOCBEGIN
tocstyle="standard"><FONT face=Arial size=+3>
<H1><FONT color=black size=+3>Table of Contents</H1>
<UL type=disc>
<LI><A href="javascript:seekToEPMarker(1,4.75)">TOC1</A></LI>
<LI><A href="javascript:seekToEPMarker(2,10.05)">TOC2</A></LI>
<LI><A href="javascript:seekToEPMarker(3,24.70)">near
end</A></LI></UL></FONT><AVIDTOCEND></FONT></BODY>
</HTML>
```

APPENDIX II

```
<HTML>
<HEAD>
<TITLE>Video Frame for Windows Media Technology</TITLE>
<style>
A:link { color:#003399; text-decoration:none; }
A:visited { color:#6699CC; text-decoration:none; }
A:hover { text-decoration:underline; }
</style>
</HEAD>
<BODY BGCOLOR="#ffffff" TEXT="#000000" LINK="#000066" VLINK="#666666">
<AVIDPUB tagtype="videdits" name="vidcx" search="OBJECT" s1name="ID"
s1val="MediaPlayer1" s2name="" s2val="" s3name="" s3val="" r1name="width"
r1pat="%1!d!">
<AVIDPUB tagtype="videdits" name="vidcy" search="OBJECT" s1name="ID"
s1val="MediaPlayer1" s2name="" s2val="" s3name="" s3val="" r1name="height"
r1pat="%1!d!">
<AVIDPUB tagtype="videdits" name="vidcx2" search="EMBED" s1name="type"
s1val="application/x-mplayer2" s2name="" s2val="" s3name="" s3val="" r1name="width"
r1pat="%1!d!">
<AVIDPUB tagtype="videdits" name="vidcy2" search="EMBED" s1name="type"
s1val="application/x-mplayer2" s2name="" s2val="" s3name="" s3val="" r1name="height"
r1pat="%1!d!">
<AVIDPUB tagtype="videdits" name="vidsrc" search="PARAM" s1name="NAME"
s1val="FileName" s2name="" s2val="" s3name="" s3val="" r1name="VALUE"
r1pat="%1!s!">
<AVIDPUB tagtype="videdits" name="vidsrcsecondary" search="EMBED" s1name="type"
s1val="application/x-mplayer2" s2name="" s2val="" s3name="" s3val="" r1name="SRC"
r1pat="%1!s!">
<CENTER>
<!-- BEGIN GENERIC ALL BROWSER FRIENDLY HTML FOR WINDOWS MEDIA
PLAYER -->
<OBJECT ID="MediaPlayer1" width=160 height=182
```

APPENDIX II-continued

```
        classid="CLSID:22D6F312-B0F6-11D0-94AB-0080C74C7E95"
        codebase="http://activex.microsoft.com/activex/controls/mplayer/en/nsmp2inf.cab#V
ersion=5,1,52,701"
        standby="Loading Microsoft ® Windows ® Media Player components . . . "
        type="application/x-oleobject">
        <PARAM      NAME="FileName"
                    VALUE="mms://epublisher-
ns/asf/winton/1999_Nov_16_11_59_56_AM_Untitled.cma.asf">
        <PARAM      NAME="ShowStatusBar"
                    VALUE="False">
        <PARAM      NAME="ShowControls"
                    VALUE="False">
        <EMBED      type="application/x-mplayer2"
                    pluginspage = "http://www.microsoft.com/Windows/MediaPlayer/"
                    SRC="markers.asx"
                    name="MediaPlayer1"
                    width=160
                    height=182
                    ShowStatusBar=false
                    ShowControls=false>
        <EMBED>
</OBJECT>
</CENTER>
<!-- END GENERIC ALL BROWSER FRIENDLY HTML FOR WINDOWS MEDIA
PLAYER -->
<SCRIPT LANGUAGE="JavaScript">
        // This function receives an integer from the buttons above and resets the current
        //      position of the file to that marker.
        function seekToVideoMarker(iWhichMarker, iTimeInMS)
        {
              if((navigator.userAgent.indexOf("IE")> -1) && (navigator.platform ==
"Win32")) {
                    // This is an error handler. If the user tries to scan to a marker which doesn't
                    // exist, the player will pop an error message. By using this code, we
                    // can create a custom error message.
                    if (iWhichMarker <= document.MediaPlayer1.MarkerCount) {
                        // This resets the current marker in the file.
                        document.MediaPlayer1.Stop( );
                        document.MediaPlayer1.CurrentMarker = iWhichMarker;
                        document.MediaPlayer1.Play( );
                    } else {
                        alert("This Marker doesn't exist.");
                    }
              } else {
                    if (iWhichMarker <= document.MediaPlayer1.GetMarkerCoun( )) {
                        document.MediaPlayer1.Stop( );
                        document.MediaPlayer1.SetCurrentMarker(iWhichMarker);
                        document.MediaPlayer1.Play( );
                    } else {
                        alert("This Marker doesn't exist.");
                    }
              }
        }
</SCRIPT>
<BODY>
<HTML>
```

APPENDIX III

```
<HTML>
<HEAD>
<TITLE>Video Frame for RealNetworks G2</TITLE>
<style>
A:link { color:#003399; text-decoration:none; }
A:visited { color:#6699CC; text-decoration:none; }
A:hover { text-decoration:underline; }
</style>
</HEAD>
<BODY BGCOLOR="#ffffff" TEXT="#000000" LINK="#000066" VLINK="#666666">
<AVIDPUB tagtype="videdits" name="vidcx" search="OBJECT" s1name="ID"
s1val="MediaPlayer1" s2name="" s2val="" s3name="" s3val="" r1name="width"
r1pat="%1!d!">
<AVIDPUB tagtype="videdits" name="vidcy" search="OBJECT" s1name="ID"
s1val="MediaPlayer1" s2name="" s2val="" s3name="" s3val="" r1name="height"
r1pat="%1!d!">
```

APPENDIX III-continued

```
<CENTER>
<OBJECT ID="MediaPlayer1"
        CLASSID="clsid:CFCDAA03-8BE4-11cf-B84B-0020AFBBCCFA"
        WIDTH=176
        HEIGHT=128>
        <PARAM   NAME="CONTROLS"
                 VALUE="Image Window">
        <PARAM   NAME="CONSOLE"
                 VALUE="Clip1">
        <PARAM   NAME="AUTOSTART"
                 VALUE="true">
        <PARAM   NAME="LOOP"
                 VALUE="false">
        <PARAM   NAME="SRC"
                 VALUE="">
        <PARAM   NAME="ShowStatusBar"
                 VALUE="False">
        <PARAM   NAME="ShowControls"
                 VALUE="False">
    <EMBED    type="audio/x-pn-realaudio-plugin"
              pluginspage = "http://www.real.com/"
              CONTROLS="ImageWindow"
              SRC=""
              name="MediaPlayer1"
              width=160
              height=182
              ShowStatusBar=false
              ShowControls=false
              AutoStart=true
              Console="Clip1">
    </EMBED>
</OBJECT>
<OBJECT ID="MediaPlayerCtl"
        CLASSID="clsid:CFCDAA03-8BE4-11cf-B84B-0020AFBBCCFA"
        HEIGHT=40
        WIDTH=275>
        <PARAM    NAME="controls"
                  VALUE="ControlPanel">
        <PARAM    NAME="console"
                  VALUE="Clip1">
    <EMBED     type="audio/x-pn-realaudio-plugin"
              CONSOLE="Clip 1"
              CONTROLS="ControlPanel"
              HEIGHT=40
              WIDTH=275
              AUTOSTART=true>
    </EMBED>
</OBJECT>
<OBJECT ID="MediaPlayerCtl"
        CLASSID="clsid:CFCDAA03-8BE4-11cf-B84B-0020AFBBCCFA"
        HEIGHT=125
        WIDTH=275>
        <PARAM    NAME="controls"
                  VALUE="All">
        <PARAM    NAME="console"
                  VALUE="Clip1">
    <EMBED     type="audio/x-pn-realaudio-plugin"
              CONSOLE="Clip 1"
              CONTROLS="All"
              HEIGHT=125
              WIDTH=275
              AUTOSTART=true>
    </EMBED>
</OBJECT>
</CENTER>
<SCRIPT LANGUAGE="JavaScript">
// This function receives an integer from the buttons above and resets the current
//      position of the file to that marker.
function seekToVideoMarker(iWhichMarker, iTimeInMS)
{
    // because it is not really in MS, but rather sec
    iTimeInMS =iTimeInMS * 1000;
    if((navigator.userAgent.indexOf("IE")> -1) && (navigator.platform == "Win32")) {
            // This is an error handler. If the user tries to scan to a marker which doesn't
            // exist, the player will pop an error message. By using this code, we
            // can create a custom error message.
//              if (iTimeInMS <= document.MediaPlayer1.GetLength( ) {
                    // This resets the current marker in the file.
                    document.MediaPlayer1.DoPlay( );
```

APPENDIX III-continued

```
                document.MediaPlayer1.SetPosition(iTimeInMS);
                document.MediaPlayer1.DoPlay( );
//          } else {
//              alert("This Marker doesn't exist.");
//          }
      } else {
//          if (iWhichMarker <= document.MediaPlayer1.GetMarkerCount( )) {
                document.MediaPlayer1.DoPlay( );
                document.MediaPlayer1.SetPosition(iTimeInMS);
                document.MediaPlayer1.DoPlay( );
//          } else {
//              alert("This Marker doesn't exist.");
//          }
        }
}
</SCRIPT>
<BODY>
<HTML>
```

What is claimed is:

1. A computer implemented authoring system for authoring a presentation of temporal media and nontemporal media, comprising:

a graphical user interface for enabling a user to interactively author the presentation using a timeline comprising one or more tracks for temporal media and nontemporal media;

data defining a spatial relationship among the temporal and nontemporal media in a display area, wherein the data indicates, for each track of the temporal media and for the nontemporal media a portion of the display area in which media from the track will be displayed and a portion of the display area in which the nontemporal media will be displayed;

wherein the graphical user interface also enables the user to modify the data defining the spatial relationship by presenting to the user, for each portion of the display area, the tracks available for the portion of the display area, and receiving from the user an indication of a track selected by the user for each portion of the display area; and a viewer having access to the timeline and the data defining the spatial relationship, and having an output providing display information for displaying the temporal media and the nontemporal media combined according to the timeline and the spatial relationship, for each of one or more specified times along the timeline.

2. The authoring system of claim 1, wherein the graphical user interface enabling the user to modify the data defining the spatial relationship includes a plurality of menus, including a menu for each portion of the display area, wherein each menu lists available tracks for selection for association with the corresponding portion of the display area.

3. The authoring system of claim 2, wherein the graphical user interface further includes a view of the display area indicating a position of each of the portions of the display area.

4. A computer implemented system for authoring a presentation of temporal media and nontemporal media, comprising:

a timeline comprising one or more tracks enabling a user to specify a sequence of temporal media and enabling a user to specify nontemporal media in a temporal relationship with the temporal media;

data defining a spatial relationship among the temporal and nontemporal media in a display area, wherein the data indicates, for each track and for the nontemporal media, a portion of the display area in which temporal media from the track will be displayed and a portion of the display area in which the nontemporal media will be displayed;

an interface enabling the user to modify the data defining the spatial relationship by presenting to the user, for each portion of the display area, the tracks available for the portion of the display area, and receiving from the user an indication of a track selected by the user for each portion of the display area; and an output through which the temporal media are presented, and in which at least the nontemporal media are presented with the defined spatial relationship with the temporal media and with a temporal relationship with the temporal media as specified by the timeline, for each of one or more specified times along the timeline.

5. The system of claim 4, further comprising a time bar associated with the timeline and manipulable by a user to specify the one or more specified times.

6. The system of claim 4, wherein the interface enabling the user to modify the data defining the spatial relationship includes a plurality of menus, including a menu for each portion of the display areas wherein each menu lists available tracks for selection for association with the corresponding portion of the display area.

7. The system of claim 6, wherein the interface further includes a view of the display area indicating a position of each of the portions of the display area.

8. A computer implemented system for authoring a presentation of temporal media and nontemporal media, comprising:

a timeline comprising one or more tracks enabling a user to specify a sequence of temporal media and enabling a user to specify nontemporal media in a temporal relationship with the temporal media;

data defining a spatial relationship among the temporal media and the nontemporal media in a display area including an indication for each track in the timeline and for the nontemporal media a portion of the display area in which temporal media from the track will be displayed and a portion of the display area in which nontemporal media will be displayed;

an interface enabling the user to modify the data defining the spatial relationship by wherein the graphical user interface also enables the user to modify the data defining the spatial relationship by presenting to the user, for each portion of the display area, the tracks available for the portion of the display area, and receiving from the user an indication of a track selected by the user for each portion of the display area; and one or more outputs through which the temporal media are presented, and in which at least the nontemporal media are presented in the specified spatial relationship with the temporal media and with the temporal relationship with the temporal media as specified by the timeline, for each of one or more specified times along the timeline.

9. The system of claim 8, further comprising a time bar associated with the timeline and manipulable by a user to specify the one or more specified times.

10. The system of claim 8, wherein the interface enabling the user to modify the data defining the spatial relationship includes a plurality of menus, including a menu for each portion of the display area) wherein each menu lists available tracks for selection for association with the corresponding portion of the display area.

11. The system of claim 10, wherein the interface further includes a view of the display area indicating a position of each of the portions of the display area.

12. A computer program product, comprising:
a computer readable medium;
computer program instructions stored on the computer readable medium that, when processed by a computer, instruct the computer to implement a user interface for a system for authoring a presentation of temporal media and nontemporal media, wherein the user interface comprises:
  a timeline comprising one or more tracks enabling a user to specify a sequence of temporal media and enabling a user to specify nontemporal media in a temporal relationship with the temporal media;
  a display area through which a visual portion of the presentation is displayed;
  data defining a spatial relationship among the temporal media and the nontemporal media in the display area, including an indication, for each track in the timeline for which media data is displayed in the display area, of a portion of the display area in which temporal media from the track will be displayed and a portion of the display area in which nontemporal media will be displayed;
  an interface enabling the user to modify the data defining the spatial relationship by wherein the graphical user interface also enables the user to modify the data defining the spatial relationship by presenting to the user, for each portion of the display area, the tracks available for the portion of the display area, and receiving from the user an indication of a track selected by the user for each portion of the display area; and
    whereby the nontemporal media are presented in the specified spatial relationship with the temporal media and in the specified temporal relationship with the temporal media as specified by the timeline.

13. The computer program product of claim 12, wherein the user interface further comprises a time bar associated with the timeline and manipulable by the user to specify one or more times in the presentation, and wherein a portion of the presentation is presented according to the one or more specified times in the presentation.

14. The computer program product of claim 12, wherein the spatial relationship among temporal media and nontemporal media is defined by a layout specification in which the display area is divided into a plurality of frames and each frame is assigned to one of nontemporal media and one of the tracks of the timeline.

15. The computer program product of claim 14, wherein the layout specification is further defined by a document in a markup language that defines a set of frames in a display area, and wherein a definition of each frame in the set of frames includes an indication of a track of the timeline or nontemporal media to which the frame is assigned.

16. The computer program product of claim 15, wherein the document in the markup language further includes additional nontemporal media that is displayed as part of the presentation.

17. The computer program product of claim 12, wherein the interface enabling the user to modify the data defining the spatial relationship includes a plurality of menus, including a menu for each portion of the display area, wherein each menu lists available tracks for selection for association with the corresponding portion of the display area.

18. The computer program product of claim 17, wherein the interface further includes a view of the display area indicating a position of each of the portions of the display area.

* * * * *